United States Patent [19]

Masuzawa et al.

[11] 4,236,152
[45] Nov. 25, 1980

[54] READOUT MEANS OF A CALCULATOR OPERATIVELY ASSOCIATED WITH A HOME USE TV IMAGE SCREEN

[75] Inventors: Sigeaki Masuzawa, Nara; Isamu Haneda, Yamatokoriyama, both of Japan

[73] Assignee: Sharp Kabushiki Kaisha, Osaka, Japan

[21] Appl. No.: 959,603

[22] Filed: Nov. 9, 1978

[30] Foreign Application Priority Data

Nov. 12, 1977 [JP] Japan .................................. 52-136063

[51] Int. Cl.³ .............................................. G06F 3/14
[52] U.S. Cl. ..................................... 340/747; 340/707; 340/722; 364/521; 364/705
[58] Field of Search ............... 340/706, 707, 711, 747, 340/701, 703, 722; 364/120, 521, 705, 710

[56] References Cited

U.S. PATENT DOCUMENTS

| | | | |
|---|---|---|---|
| 3,867,619 | 2/1975 | Arauchi | 364/705 |
| 3,976,995 | 8/1976 | Sebestyen | 340/311 |
| 3,984,638 | 10/1976 | Carrouge | 340/706 |
| 4,016,554 | 4/1977 | Evans et al. | 364/521 |
| 4,026,555 | 5/1977 | Kirschner | 340/711 |
| 4,056,713 | 11/1977 | Quinn | 364/521 |
| 4,134,149 | 1/1979 | Nord | 340/711 |
| 4,150,364 | 4/1979 | Baltzer | 340/707 |
| 4,151,596 | 4/1979 | Howells | 364/705 |

*Primary Examiner*—Marshall M. Curtis
*Attorney, Agent, or Firm*—Birch, Stewart, Kolasch & Birch

[57] ABSTRACT

A combination of an electronic calculator, a home use television receiver and a signal converter interface is suited for displaying a coordinative representation calculated from the calculator onto the image screen of the calculator or onto the image screen of the television receiver. There is included the signal converter interface for converting outputs from the calculator into signals of the form competent with the television receiver (that is, a composite television signal).

40 Claims, 24 Drawing Figures

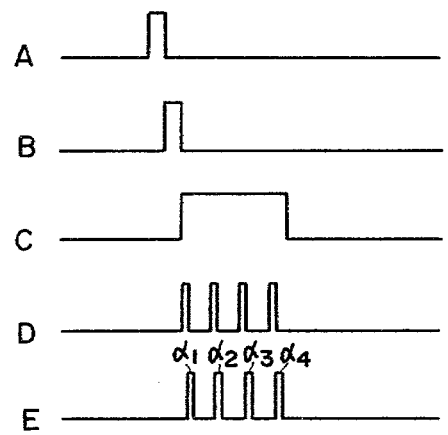
FIG. 22
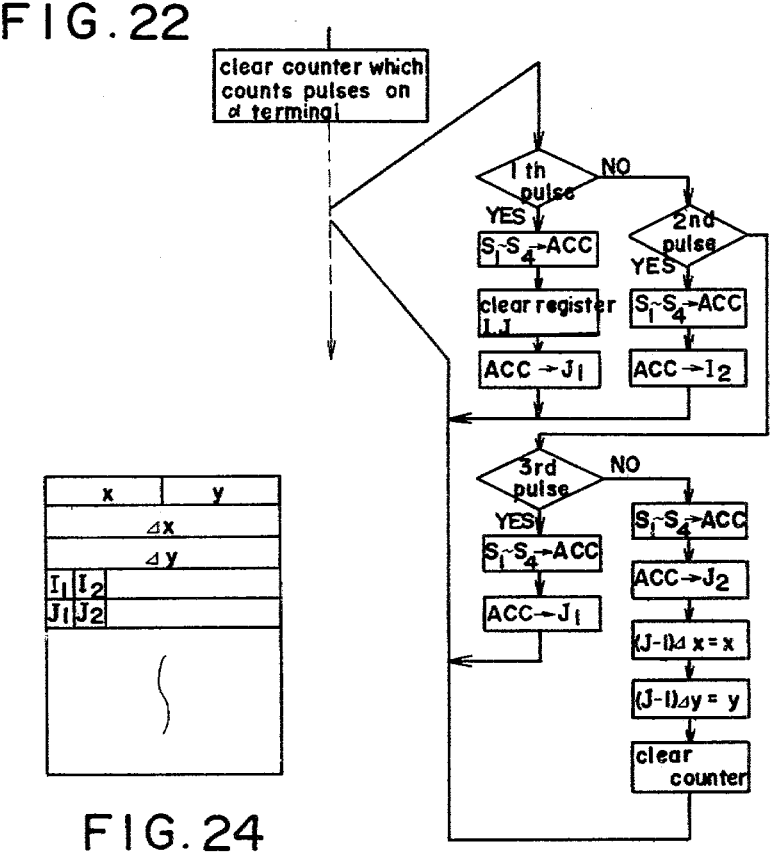
FIG. 24
FIG. 23

READOUT MEANS OF A CALCULATOR OPERATIVELY ASSOCIATED WITH A HOME USE TV IMAGE SCREEN

BACKGROUND OF THE INVENTION

The present invention relates to a readout means of a calculator for providing a visual display of functional loci, coordinate axes, characters, symbols or the like.

A visual display of loci of specific functions is very useful during the process of various functional calculations.

To display these functional loci, it was necessary to provide a data processor and an exclusive use cathode ray tube so that the whole system including the readout means was bulky, massive expensive, and hard to handle.

Meanwhile, during the process of functional calculations or the like it is very convenient for the operator to learn, in a digital fashion, coordinate positions of specific points on the loci being displayed, for example, coordinate positions of an intersection of two loci.

It is therefore an object of the present invention to provide a readout means of an electronic calculator capable of providing information necessary for displaying functional loci, characters or the like on a TV receiver screen and displaying specified positions on the TV screen.

BRIEF DESCRIPTION OF THE DRAWINGS

Other objects and many of the attendant advantages of the present invention will be readily appreciated as the same becomes better understood by reference to the following detailed description which is considered in conjunction with the accompanying drawings, and wherein:

FIG. 22 is a waveform chart associated with the circuit of FIG. 20;

FIG. 23 is a flow chart showing calculations of coordinates positions; and

FIG. 24 is a diagram of an example of a portion of a RAM.

DETAILED DESCRIPTION OF THE INVENTION

Figure 1:
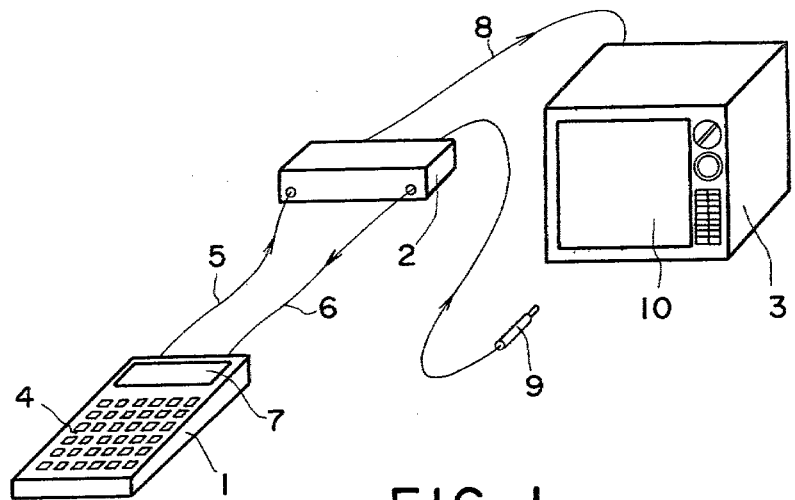
FIG. 1 is a schematic diagram of an electronic calculator embodying the present invention in its one preferred form.

Referring now to FIG. 1, there is illustrated a perspective view of an electronic calculator 1, a signal converter interface 2 and a conventional or home use television receiver 3.

The calculator 1 performs well known four-rule calculations and operation of a keyboard 4. The calculator 1 further operates to obtain video information indicative of functional loci, characters or the like and sends the same to the signal converter interface 2 via a line 5. Position information of a specific point in a locus being displayed on the TV receiver 3 is supplied via another line 6 from the signal converter interface 2 and displayed digitally through a viewing window 7.

Figure 14:
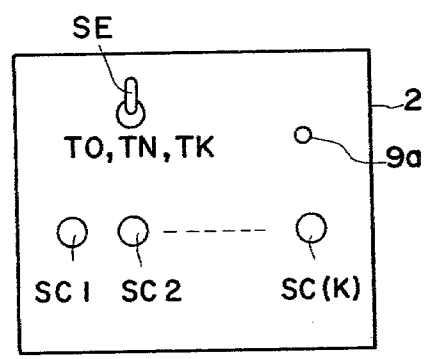
FIG. 14 is a plane view of an operational panel of the signal converter interface.

The signal converter interface 2 which plays an important role in the present invention, converts video information obtained from the calculator 1 into a composite video carrier of the normal or standard type which is competent to supply to an antenna terminal of the TV receiver 3. Actually, the video carrier is sent to the antenna terminal of the TV receiver 3 for producing position information indicative of coordinate positions of a specific point on the TV screen designated by a pen light 9 connected to a jack hole 9a (FIG. 14).

Figures 3, 4:
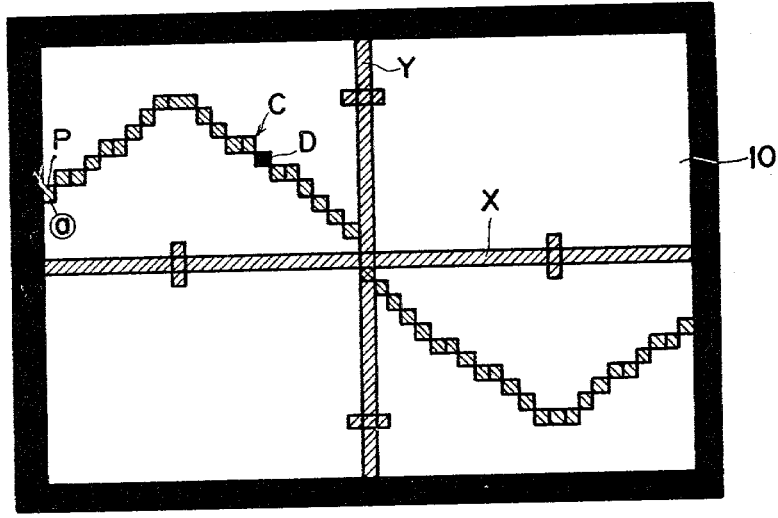
FIG. 3 is a layout of a keyboard in the embodiment of FIG. 1.
FIG. 4 is a diagram showing an example of displaying a functional locus derived from the calculator embodying the present invention onto an image screen of a TV receiver.
Figure 5:
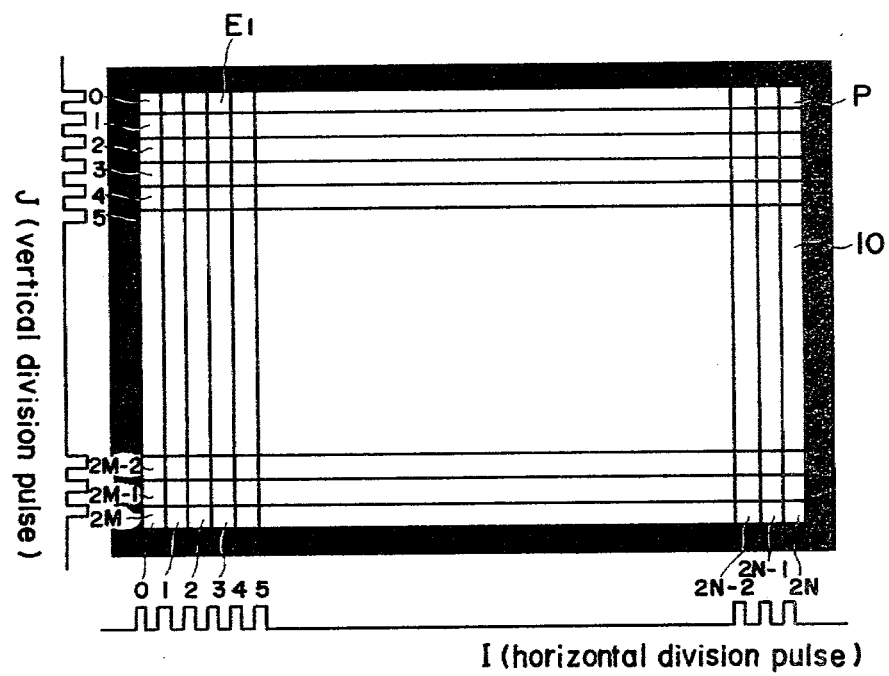
FIG. 5 is a diagram for explanation of a display method used with the embodiment of FIG. 1.
Figure 6:
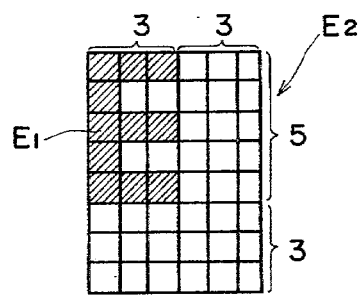
FIG. 6 is a diagram for explanation of a display method for displaying characters, symbols or the like in the embodiment of FIG. 1.

On an operational panel of the calculator 1, as viewed from FIG. 3, there are provided a plurality of keys PM, PX, PY, ST, BACK, RO, SP, LF, etc. The functions of those keys will be described later. It is obvious from FIG. 3 that there are further provided well known various keys of the calculator, that is, function select keys 1b, digit keys 1c and program keys 1d.

According to the present invention, a functional locus C and coordinates axes X, Y are visually displayed on the image screen 10 of the TV receiver 3 by the video information such as a functional locus sent from the calculator 1. The functional locus and the coordinates axes are made up of a succession of picture elements P and displayed at a proper brightness. A single picture element P corresponds to a picture element of a matrix of $(2M+1)\times(2N+1)$ (M,N: an arbitrary multiple). The coordinate axis in the column (horizontal) direction of the respective one of the picture elements is represented by, for example, the number of the picture elements counted from the extreme left of the image screen, whereas the counterpart in the row (vertical) direction by the number of the picture elements counted from the top of the image screen. The video information sent from the calculator 1 consists of a signal I indicative of a coordinate position in the column direction, a signal J indicative of a coordinates position in the row direction J, a signal R indicative of the time relationship between these two signals I, J, and a signal D of which logic levels "1" and "0" are indicative of whether the picture element on the coordinates specified by these two signals I, J is to be lit. In the given embodiment, the signals I, J are 5-bit binary coded decimal code signals indicative of the row and column positions.

Figure 7:
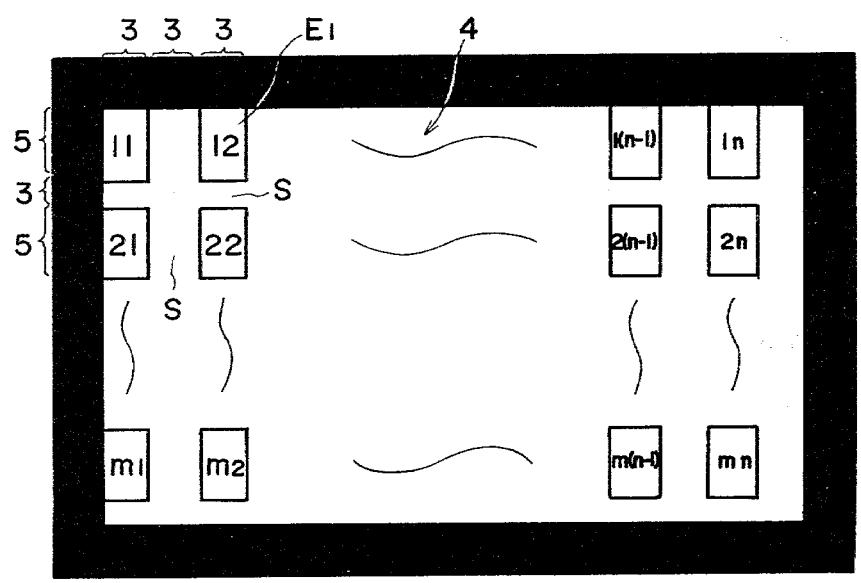
FIG. 7 is a diagram showing a layout of characters, symbols or the like displayed on the TV image screen.

In displaying characters, symbols or the like on the image screen 10, the image screen is split into a predetermined number of unit areas $E_1$ each consisting $3\times 5$ (3 column by 5 row) picture elements and further including a space area S consisting of 3 column $\times$ 3 row picture elements. In other words, the image screen 10 comprises $n\times m$ unit areas $E_2$ each consisting of a 6 column by 8 row matrix of the picture elements (see FIG. 7).

As already described, the position of the unit areas $E_1$ within the image screen 10 is determined by the video information signals I, J, R, D. Of the operational mode key group $I_a$, upon depression of the keys BACK, LF and SP, the calculator provides an output calling for movement of the position of the unit areas $E_1$. In the given embodiment, the position of the respective unit areas $E_1$ is specified by the keys BACK, LF and SP with respect to the whole dimension. The image screen is referred to as a "cursor" and the video information, such as characters, digits, symbols, four-rule calculation symbols called for by depression of the key groups 1b, 1c, is referred as to "key information".

Figure 8:
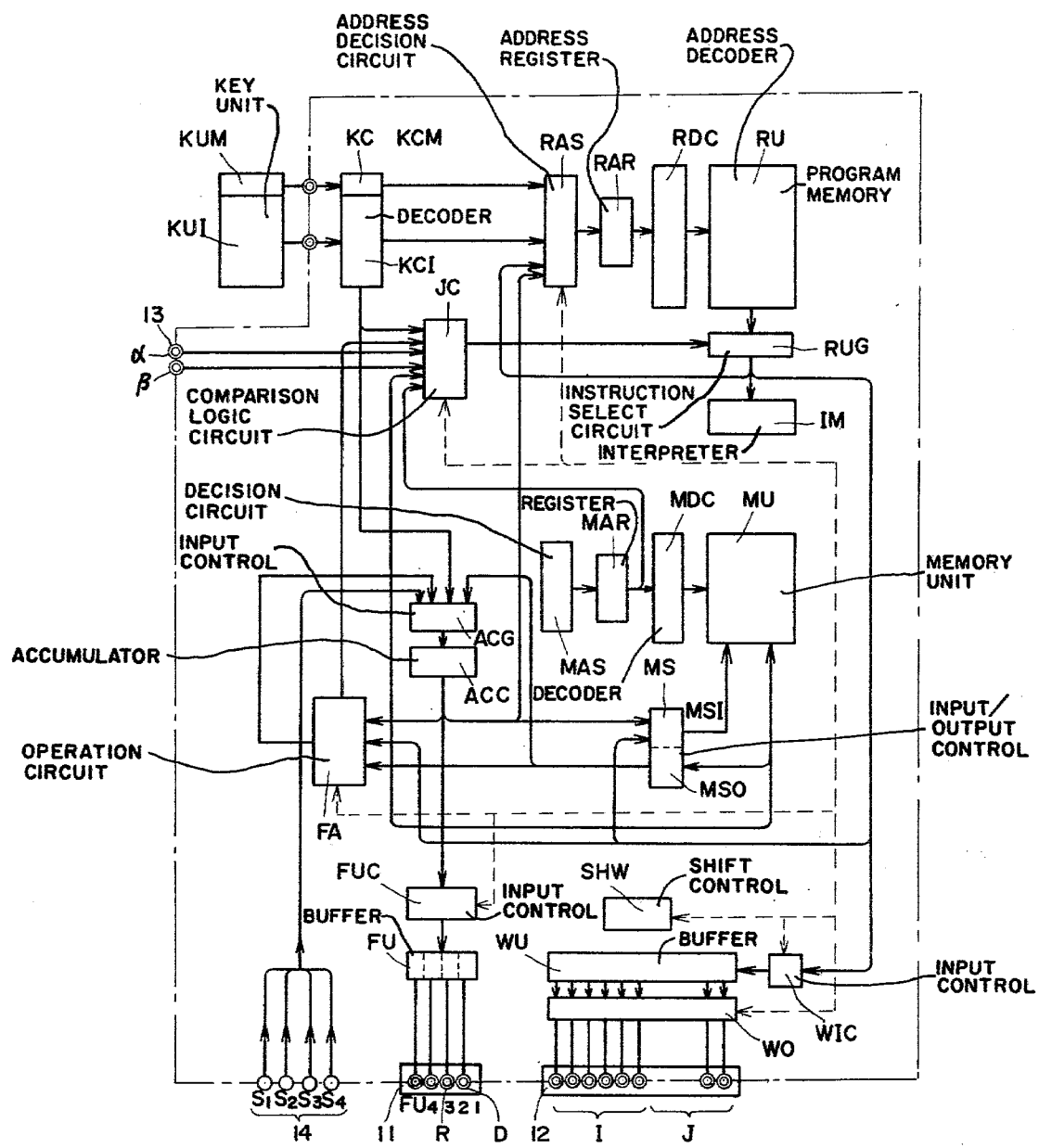
FIG. 8 is a more detailed block diagram of the calculator of the embodiment of the present invention.

The calculator 1 will be detailed by reference to FIG. 8. In FIG. 8, a key unit KU can be divided into two kinds of key groups: the locked type KUM covering the above mentioned operational mode key group 1a and the self-restoring type KUI covering the function select key group 1b, the digit and symbol key group 1c and the program key group 1d.

The operational mode key group 1a concerning a display of a locus, etc. will be first described by reference to FIG. 3. A locus display key PM is provided to call for a display of functional loci, coordinates axes, characters, symbols, etc. on the image screen.

PX and PY keys are provided to specify unit dimensions $\Delta x$ and $\Delta y$ concerning the coordinate axes Z and Y on the image screen 4. If the PX key, and the digit "3" key are sequentially depressed, for example, then the unit dimension $\Delta x$ will be specified as 3 and the unit dimension $\Delta y$ will be specified as 3.

The BACK key instructs the cursor indicative of the position of the unit area $E_1$ to shift one column to the left, the SP key instructs the cursor to shift one column to the right, the LF key instructs the cursor to change the row, and the RO key calls for erasure of an image on the unit area $E_1$ or specifies the space area. The ST key is a start key.

Reverting again to FIG. 8, a key decoders KC, KC1 and KCM are provided for the key units KU, KU1 and KUM, respectively.

A program memory RU is implemented with, for example, a read only memory (ROM). A memory unit MU is implemented with, for example, a random access memory (RAM) and includes a plurality of memory sections I, J, x, y, $\Delta x$, $\Delta y$, A, $M_1$, $M_2$, PC and register sections W, Z (not shown). An operation circuit FA executes additions or subtractions. There are also provided a comparator logic circuit JC, an accumulator ACC, an input control ACG for the accumulator ACC.

An address decision circuit is denoted by MAS, an address register is denoted by MAR, an address decoder is denoted by MDC and an input/output control MS includes an input control MSI and an output control MSO. Those components MAS, MAR, MDS serve for the memory unit MU.

An address decision circuit is denoted by RAS, an address register is denoted by RAR, an address decoder is denoted by RDC, and an instruction select circuit is denoted by RUG. These components RAS, RAR, RDC and RUG serve for the program memory RU. IM is an interpreter for decoding instructions from the program memory RU.

A first output buffer register FU is under the control of an input control FUC and connected to first output terminals 11 where the above described signals R, D, are available.

A second output buffer register WU is controlled by an input control W1C, a shift control SHW and an output terminals 12 which receive the video information signals I, J. The signals R, D and I, J are provided to the first and second output terminals 11 and 12 in the following manner in order to display a functional locus on the screen 10 of the TV receiver 3, with referring to FIG. 11 showing an operational flow chart and FIG. 8 showing the calculator 1.

Figure 11:
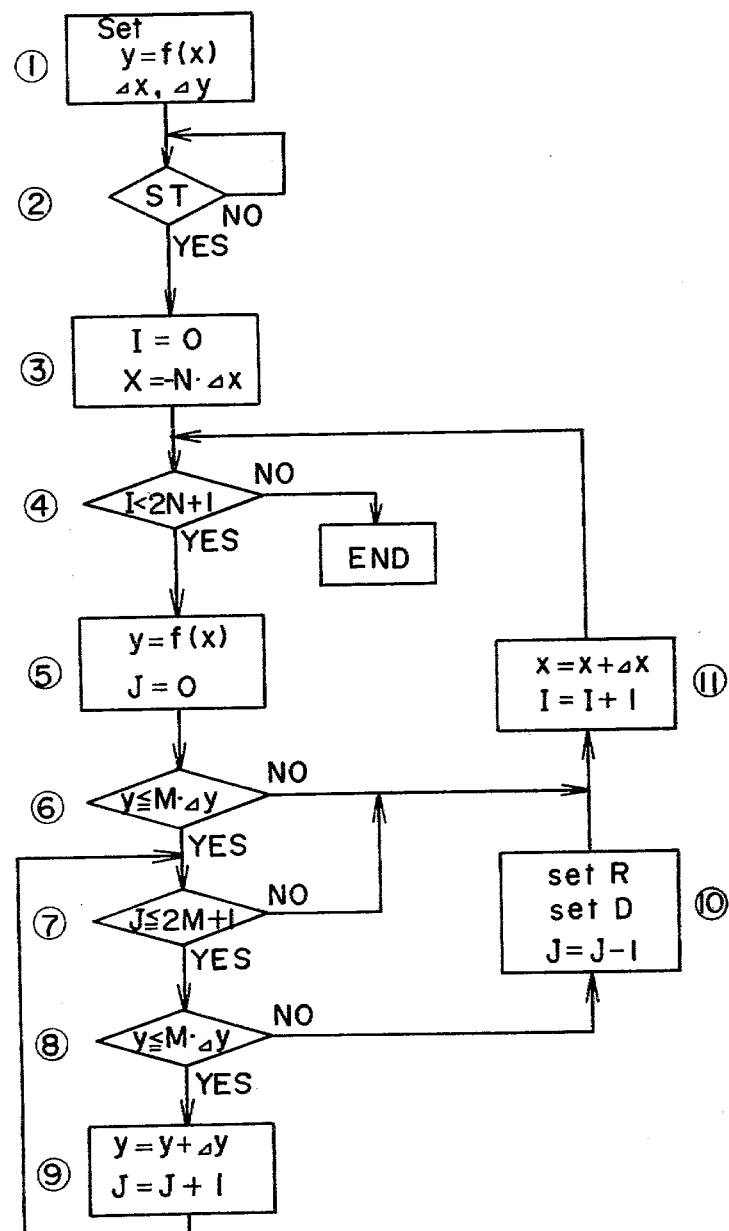
FIG. 11 is a flow chart of the procedure where video information indicative of functional loci is derived from the calculator of FIG. 8.

Attention will be first invited to FIG. 11 wherein the key unit KU of the calculator 1 is manipulated to obtain the video information signals I, J, R, D concerning a functional locus during the step ①.

Figure 2:
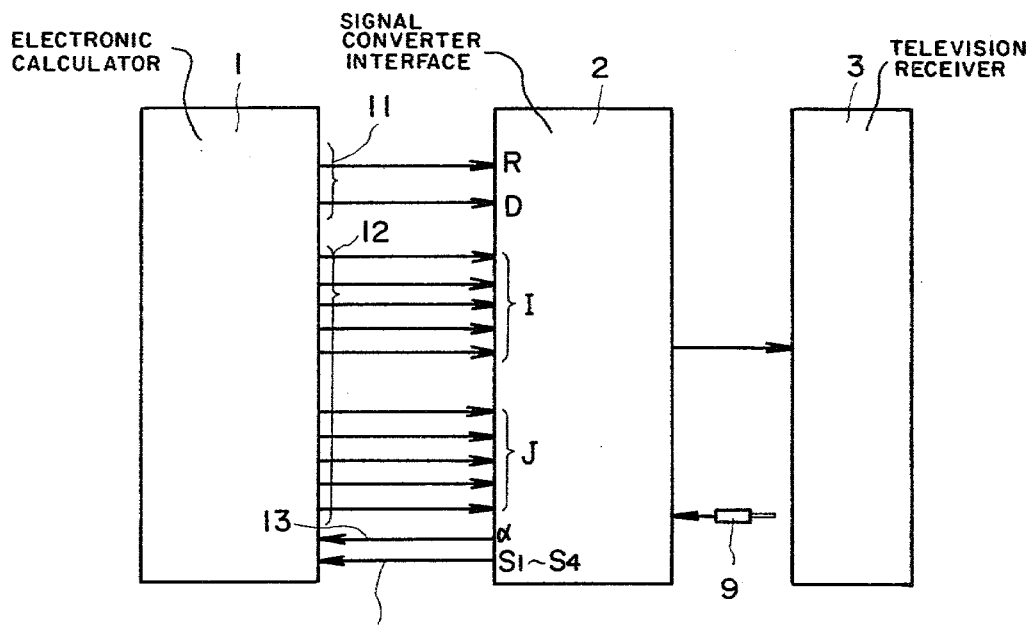
FIG. 2 is a block diagram of the embodiment shown in FIG. 1.

The PX key is operated and then one of more digit keys corresponding to the unit dimension $\Delta x$ are depressed. Subsequently, the PY key is depressed and one or more digit keys corresponding to the unit dimension $\Delta y$ are depressed. Following depression of the PM key, a proper function key of the function select key group 1b is selected to execute programming of a function $f(x)$ to be displayed. When the desired function $f(x)$ is $e^x \cdot \sin x$, for example, the key groups of FIG. 2 will be depressed in the following order:

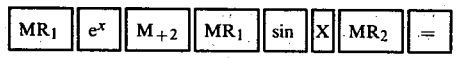

These key depressions complete programming of the function $e^x \cdot \sin x$ in the calculator 1.

In FIG. 8, depression of the PX key is stored in a 1 bit memory element of the memory unit MU. When one or more digit keys are then depressed, this depression is sensed by the comparison logic circuit JC. Numerical data is sensed as the unit dimension $\Delta x$ and loaded into the memory section $\Delta x$ of the memory unit MU. In other words, the procedure is advanced in the order of KU1→KC1→ACG→ACC→MSI→MU. Upon subsequent depression of the PY key, the memory storing the depressed state of the pX key is impelled into the set state so as to learn depression of the PX key. Subsequent to this, one or more digit keys are operated and monitored by the comparison logic circuit JC to decipher numerical data as the unit dimension Δy so that numerical data indicative of the unit dimension Δy is loaded into the memory section Δy of the memory unit MU. The PM key is operated and desired keys of the key groups 1b, 1c, 1d are depressed to specify the function f(x). Then, the corresponding instruction code signals are loaded in sequence into the memory section A of the memory unit MU. The instruction specifying the function by the PM Key will be cleared by the memory element (a flip-flop etc.) storing the depression state of the pM key. That memory element is reset by depression of the ST key during the next step ②.

When it is desired to display the same functional locus with only variations in the unit dimensions Δx, Δy, ahead of depression of the ST key, the key depression should be carried out in the same way as above to load the unit dimensions Δx, Δy.

To unload the instruction specifying the function f(x) of the functional locus to be displayed, the corresponding memory element of the memory unit MU may be reset by depression of any key of the key unit KU following depression of the PM key. In this way, after completing the programming during the step ①, the ST key is depressed during the step ② with advance toward the step ③.

The step ③ is executed in the way that a value of the memory section I is reduced to 0 and a variable x in the function f(x) is established. This means I=O and x=−N·Δx. Thus, the memory section I of the memory unit stores 0 and the other memory section x stores −N·Δx. The value N corresponds to the number of an intermediate column of the image screen 10 in the columb direction.

During the step ④ the value in the memory section I is compared with the value 2N. If the value in the memory section I is O, then an answer will be YES with making the next step ⑤ operative.

Calculations are executed on the functions f(x) on the step ⑤. The contents of the memory section x in the memory unit MU are transferred into the first memory section M₁ pursuant to the instruction derived from the program memory RU. As viewed from FIG. 8, the operation is executed in the order of Mu→MSO→FA→ACG→ACC→MS→MU. Calculations are then executed on the variable x of the function f(x) contained within the memory section A of the memory unit MU. In FIG. 8, the code signals corresponding to the key $\boxed{MR_1}$ are loaded into the accumulator ACC and the ROM within the program memory RU is addressed so that an instruction is recalled from that addressed ROM to transfer the contents of the memory section M₁ into the register section W of the memory unit MU. Therefore, x contained within the memory section M₁, that is, −N·Δx is unloaded into the register W. Calculations of $e^x$ are carried out by incrementing PC in this manner. The results of these calculations are temporarily stored in the memory area M₂ specified by the $\boxed{M_{+2}}$ key. Subsequently, calculation of sin x are executed in the same way as in the calculations of $e^x$ with the calculation results being loaded into the register W. Under the circumstance depression of the multiply key X instructs the results of $e^x$ to be multiplied by the results of sin x, with the product thereof being loaded into the register W. The contents of the register W are then introduced as the functional value y into the memory area y. After the functional value y is evaluated in this manner, the memory area J in the memory unit MU stores O. The next succeeding step ⑥ is carried out in order to determine the picture elements or the row positions corresponding to the functional value y out of the first column picture element succession (2M+1).

During the step ⑥ the functional value y within the memory area y of the memory unit MU is compared with the value M·Δy.

This is a processing that determines whether the row positions corresponding to the functional value y evaluated during the step ⑤ extend beyond the upper edge or lower edge of the image screen 4. Pursuant to an instruction from the ROM in the program memory RU, the value M is loaded into the register area W in the memory unit MU. As stated above, the value M is one half the number of the picture elements 2M+1 in the row direction on the image screen 4. In FIG. 8, the operational events are executed in the order of MU→MSO→ACG→ACC→MSI→MU. A product of the contents of the register area W in the memory unit MU and the contents of the register area Z is entered into the register area W. The contents of the memory area y in the memory unit MU are transferred into the register area Z so that the operation circuit FA is ready for a subtraction of W-Z. If a difference is negative, then the operation circuit FA will provide a carry (one pulse signal). At this time the comparison logic circuit JC senses this carry. This implies that the contents of the register Z are greater than the contents of the register W and this the functional value y is greater than the value M·Δy. In the event that y is greater than M·Δy and there are no row positions in the image screen 4, the logic decision circuit JC will conclude a YES in the step ⑥. In case of the YES answer, the step ⑦ is executed.

Comparison is made between the value in the memory area J and the value 2M+1 during the step ⑦. In other words, decision is made as to whether the row position in the image screen 4 corresponding to the functional value y is located above the lowest row (2M row). When the value in the memory area J is greater than 2M+1, the step ⑪ is activated in the same way as in the NO answer during the step ⑥. When an answer is YES during the step ⑦, the next step ⑧ is reached.

Comparison is made between y and M·Δy during the step ⑧ as during the step ⑥. If an answer is NO and thus y is greater than M·Δy, the step ⑦ or ⑨ will be repeated.

The step ⑨ is carried through in order to accumulate the unit dimension Δy, that is, y+Δy and perform counting of the accumulations, that is, J+1. The contents of the memory area y in the memory unit MU are shifted to the register W and the contents of the memory area Δy to the register Z, such that the operation circuit FA performs additions of the contents in the registers W and Z, the results thereof being loaded into the memory area y. Upon arrival of an instruction from the program memory RU, the accumulator ACC is added with 1 and the contents of the memory are J in the memory unit MU are applied to the operation circuit FA which in turn, performs additions of 1 to the value contained within the memory area J. The results of the additions are stored again in the memory area J in the memory unit MU.

These steps ⑦, ⑧ and ⑨ are repeated until the comparison during the step ⑧ provides a NO answer. These steps are completed to determine the position of the functional value y indicated by the number of rows on the image screen 10. When a NO answer is obtained during the step ⑧, the next step ⑩ is executed.

The step ⑩ considers as the row position of the functional value y the value of the memory area J which is "one" subtracted. The value of the memory area I (now "0") during the step ④ and the value of the memory area J determined during the step ⑩ are provided as the video information signals I, J from the output terminals 12 in the representation form of 5-bit BCD code, these values being indicative of the column position of the variable x and the row position of the function f(x). Pursuant to an instruction from the program memory RU, data is introduced into the accumulator ACC and then data in the accumulator ACC is sent to the first output buffer register FU. The signals D, R are supplied from the first output terminals 5. In other words, the setting D and resetting R are accomplished.

In the case where a NO answer is concluded during the step ⑥ or ⑦, the step ⑪ is carried out within performing the setting or resetting processes D or R.

During the step ⑪ "1" is added to the memory area I to thereby add the unit dimension Δx to the value in the memory area x. As previously set forth, "1" is added to the contents of the memory area I in the memory unit MU and the contents of the memory area Δx are added to the contents of the memory area Δx with the aid of the operation circuit FA. These results are loaded respectively into the memory areas I and x.

By repeating the steps ④ through ⑪ the column and row positions concerning the function f(x) ($e^x \sin x$ in the above illustrated embodiment) are sequentially determined beginning with the first column (the extreme left) and ending with the 2Nth column (the extreme right).

The forwarding process of the video information concerning the functional locus is completed when a NO answer is concluded during the step ④, that is, when the video information signlas I, J, D, R, concerning the functional locus with respect to the extreme right (ZN) column of the image screen 10 are completely sent to the respective output terminals 12, 11.

Figure 12:
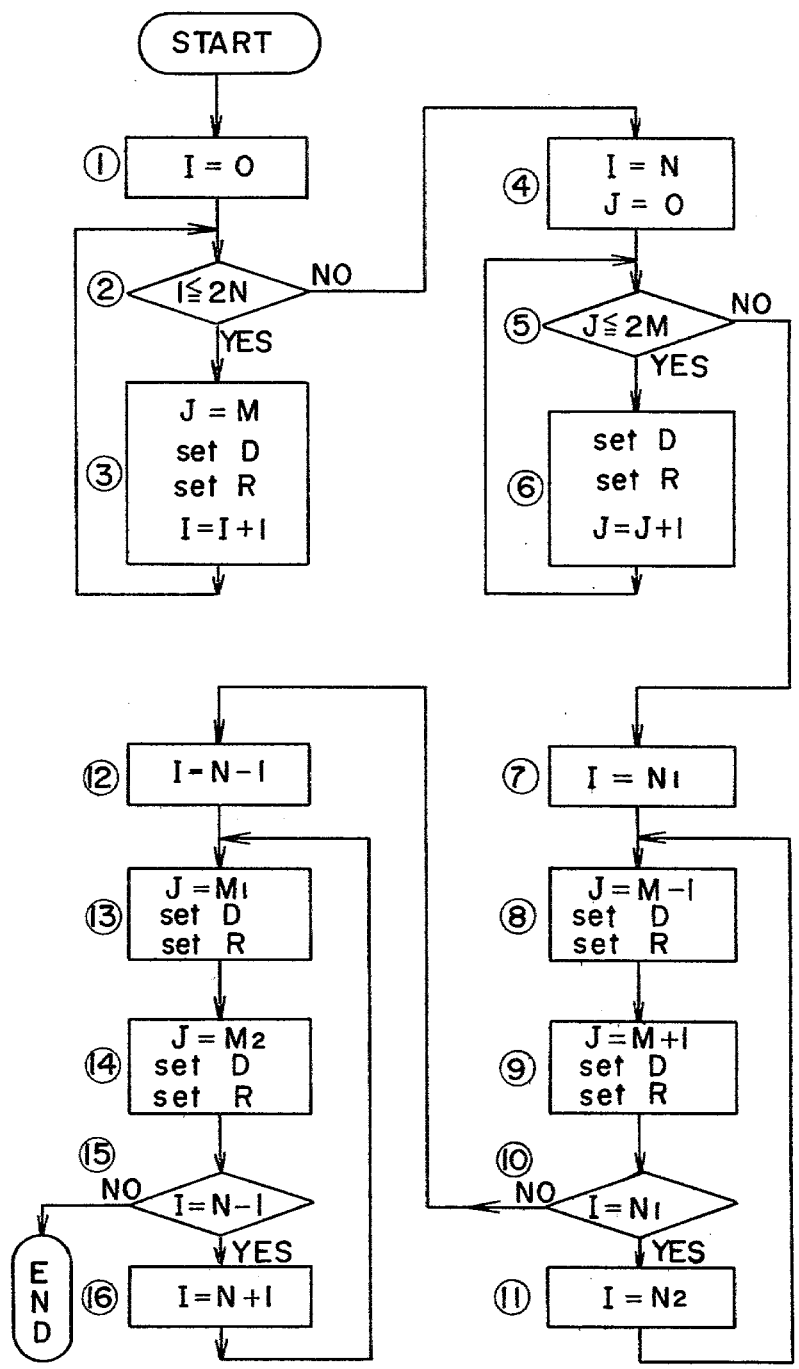
FIG. 12 is a flow chart of the procedure where video information indicative of coordinates axes is derived from the calculator of FIG. 8.
Figure 13:
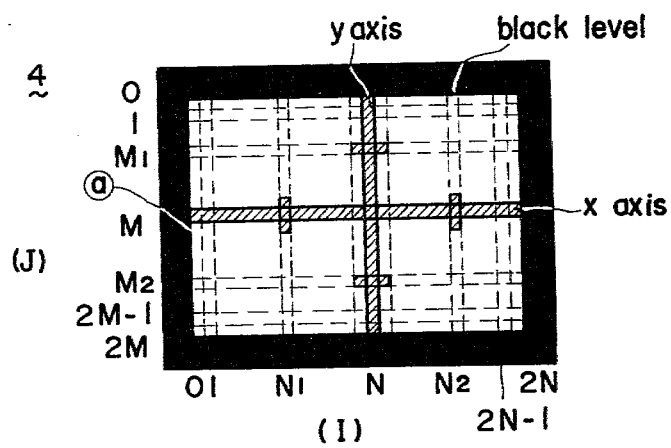
FIG. 13 is a diagram for explanation of a display method for coordinates axes to be displayed on the image screen.

The operation where the video information regarding the x and y coordinates axes is provided for the output terminals 12, 11 of the calculator, side 1 will be described in detail by reference to FIG. 12 showing a flow chart and FIG. 8 showing the construction of the calculator 8. FIG. 13 depicts an image displayed on the image screen of the TV receiver 3 according to that video information. FIG. 12 is a flow chart of the calculation of the coordinate axes.

During the step ① of FIG. 12, the value of the memory section I is "0". In other words, as seen from FIG. 8, the PM key is depressed and then sensed by the key decoder KCM so that the program memory RU is properly addressed to deliver an instruction to place "0" into the memory area I in the memory unit MU. This sequential procedure means RUG→MSI→MU.

During the next step ② information I is computed with 2N which corresponds to the column number of the extreme right of the image screen 10 in the horizontal direction. This procedure is accomplished by the comparison logic circuit JC of FIG. 8. Since the memory area I stores "0", an answer will be YES to make the step ③ operative.

The memory area J is loaded with M during the step ③. The step ③ is carried through like the step ①. For example, a given value is loaded into the memory areas I, J and then transferred into the second output buffer register WU. In this instance, the contents of the memory are I are compared bit by bit within the comparator logic circuit JC. If it is "0", the second output buffer register WU is loaded with "0" from the input control WIC. If it is "1", the input control WIC places "1" into the second output buffer register WU. An instruction from the program memory RU instructs the input control WIC so send data to the second output buffer register WU. Whether data is "1" or "0" is determined by utilizing a one bit contained within that instruction. In other words, the procedure is advanced as RUG→WIC→WU. The shift control SHW permits the contents of the second output buffer register WU to be shifted each time data ("1" or "0") is applied to the second output buffer register WU. This results in serial the loading of the same data as in the memory area I is serially loaded into the second output buffer register WU. Similarly, the same data as in the memory area J is entered into the second output buffer register WU. After the second output buffer register WU is loaded with data within the memory areas I, J, the output control WO is enabled such that data in the memory areas I, J, that is, the video information I data indicative of the y axis of the image screen, are provided for the output terminals 12 in the form of 5-bit BCD code. Upon arrival of an instruction from the program memory RU, data is loaded into the accumulator ACC and then transferred into the first output buffer register FU to develop the signals D, R at the output terminals 11. In other words, the setting D and resetting R are carried out. Thereafter, "1" is added to the contents of the memory area I. The accumulator ACC is loaded with "1" and the memory area I is allotted within the memory unit MU so that the operation circuit FA adds the contents of the accumulator ACC viz., "1" to the contents of the memory area I. The operation result is returned to the accumulator ACC and then sent to the memory area in the memory unit MU to complete a calculation of 1+L.

In summary, the above steps ② and ③ are executed in such a way that the video information signals I, J, D, R indicative of the first column and Mth row position (denoted by ⓐ) on the image screen 4 of FIG. 13, in other words, the position (0, M) are provided for the output terminals 12, 11. By repetition of the steps ② and ③, the video information signals I, J, D, R indicative of the positions (0, M), (1, M), (2, M) . . . (2N, M) are sequentially provided. These video information signals I, J, D, R relates to the locus on the x axis as shown in FIG. 13. When the contents of the memory area I reaches 2N+1 during the step ③, an answer is NO during the step 2. The next step ④ is executed.

During the step ④ the memory area I is loaded with N and the memory area J is loaded with "0". The next succeeding steps ⑤ and ⑥ are executed in the same way as in the steps ② and ③. Execution of the step ⑥ provides the video information signals I, J, D, R indicative of the position (N, 0) for the output terminals 12, 11.

While repeatedly executing the steps ⑤ and ⑥, the video information signals I, J, D, R indicative of the respective positions (N, 0), (N, 1), (N, 2), . . . (N, 2M) on the screen 10 are developed at the output terminals 12, 11. These video information signals I, J, D, R pertain to the locus on the y axis as shown in FIG. 13.

If J is equal to 2M+1 during the step ⑤, then the step ⑦ will be executed where the memory area I is loaded with $N_1$. As seen from FIG. 13, $N_1$ is a pre-selected value corresponding to the position of the $N_1$th column on the screen 10 in the column direction.

The step ⑧ is executed to load the memory area J with "M−1". Subsequently, the setting D and the resetting R are executed. At this time the video information signals I, J, D, R indicative of the position ($N_1$, M−1) are developed at the output terminals 12, 11. The next step is ⑨.

The memory area J is loaded with M+1 during the step ⑨, followed by the setting D and resetting R. At this time the video information signals I, J, D, R indicative of the position ($N_1$, M+1) on the image screen 10 are developed at the output terminals 12, 11. The step ⑩ is executed to determine whether the value of the memory area I is $N_1$. Since the contents of the memory area I are now $N_1$, an answer is YES to permit the step ⑪ to be executed.

During the step ⑪ the memory area I is loaded with $N_2$ which is a pre-selected value like $N_1$. Subsequently, the steps ⑧ and ⑨ are processed. In this way, the video information signals I, J, D, R indicative of the positions ($N_2$, M−1) and ($N_2$, M+1) on the screen 10 are developed at the output terminals 12, 11. The step ⑩ is carried out to determine whether the contents of the memory area I are $N_2$. Then, the step ⑫ is executed.

By the steps ⑫ through ⑯ and ⑬ through ⑮ like the above stated steps ⑦ through ⑪ and ⑧ through ⑩, the video information signals I, J, D, R indicative of the positions (N−1, $M_1$), (N−1, $M_2$), (N+1, $M_1$) and (N+1, $M_2$) are developed at the output terminals 12, 11.

As noted earlier, the calculator 1 provides the video information signals I, J, D, R indicative of the x and y axes and the marker (denoted by the slant line in FIG. 13) on the image screen 10.

Figure 9:
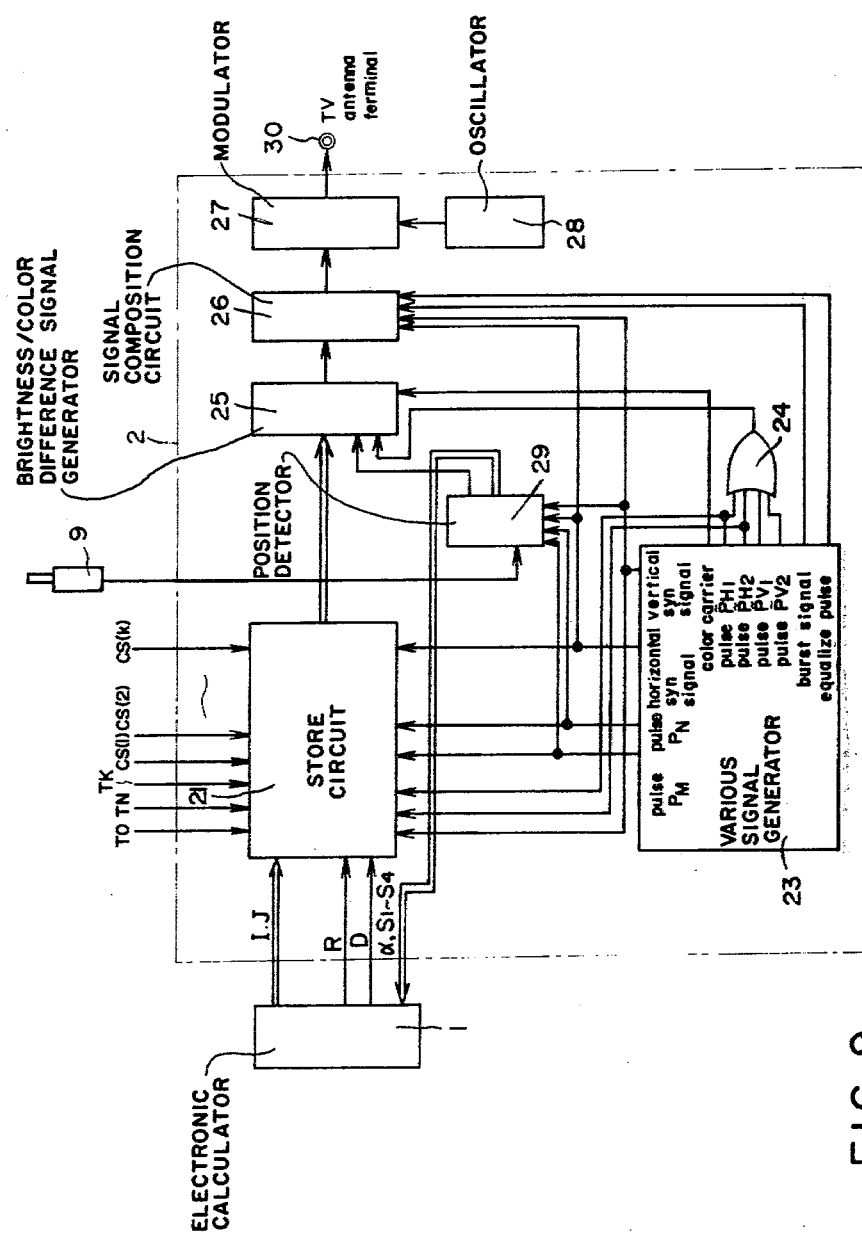
FIG. 9 is a block diagram of a signal converter interface which converts output signals of the calculator of FIG. 8 into television composite video signals.

The following description will set forth details of the signal converter interface 2 by reference to FIG. 9 showing a block diagram thereof.

A store circuit 21 of FIG. 9 stores the video information signals I, J, R, D necessary for displaying the functional locus, X and Y coordinates axes, characters, symbols, or the like on the image screen 10, these signals being derived from the calculator side 1. The store circuit 21 will be described with respect to FIG. 10.

Figure 10:
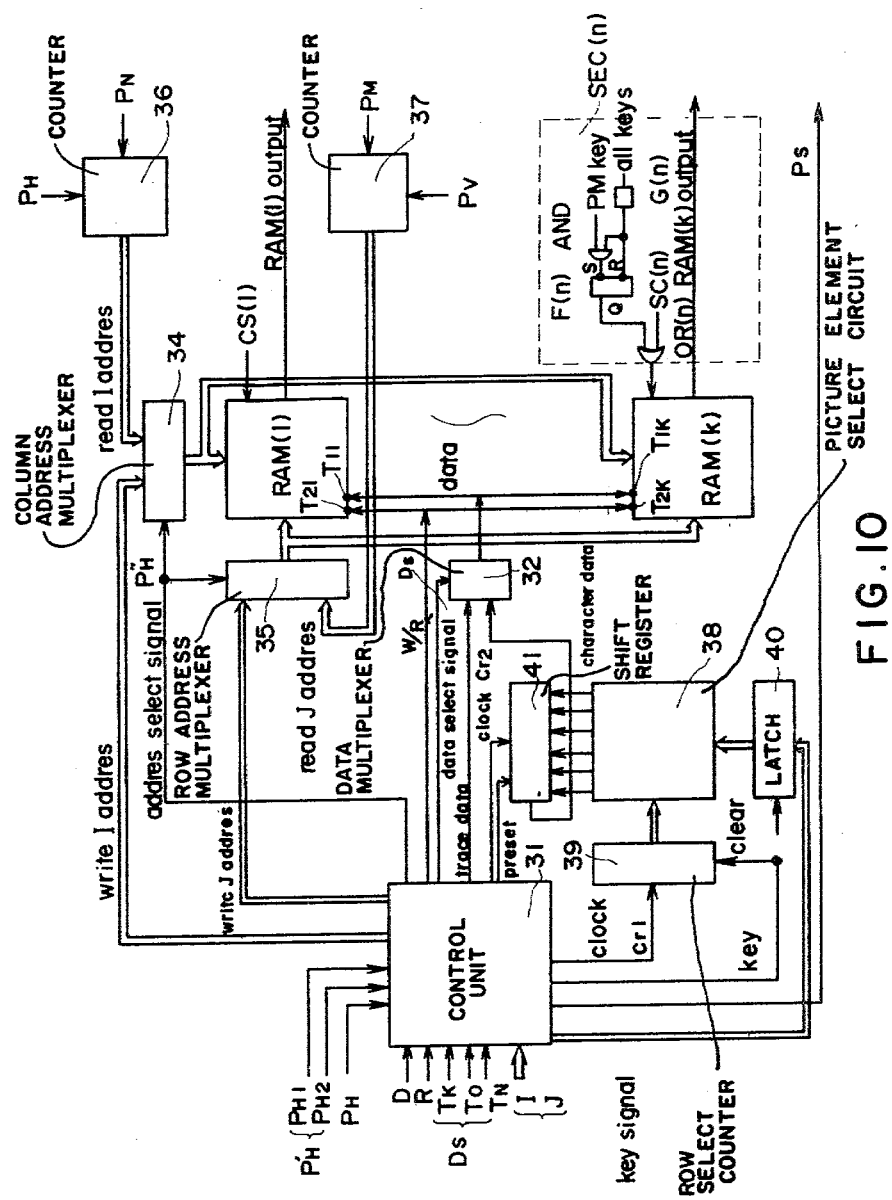
FIG. 10 is a block diagram of an example of a store circuit in the signal converter interface of FIG. 9.

In FIG. 10, $RAM_1$ through $RAM_k$ denote k RAM (random access memory) each consisting of (2N+1)×(2M×1) memory elements corresponding to a respective one of the picture elements on the image screen 10. These are referred to as "RAM(n)" hereinafter. k select switches $SC_1$ through $SC_k$ of FIG. 14 are provided for selection of the RAM(n) where the video information signals I, J, D from the calculator 1 are to be written. These select switches $SC_1$-$SC_k$ are connected to input terminals $T_{11}$, $T_{12}$, $T_{13}$-$T_{1k}$ of the respective RAMs. The RAM(m) (M: the identifying number of a select one of 1 through k) connected to the select switch SCm in the ON state is supplied with the video information signals I, J, D. The selected RAM(m) is, therefore, written or loaded with the video information signals.

A control switch SE of FIG. 14 provides a control for the write operation of the RAM(m) according to whether the above described video information signals concern the functional locus and the coordinates axes or other characters, symbols, or the like.

The control SE is, for example, the toggle type switch and, when turning to the TK side, supplies a control unit 31 described below with a data select signal $D_s$"1" so that the RAM(m) is ready to receive only the video information signals concerning the characters, symbols or the like in response to key depression of the key unit KU. When the control switch SE is inclined toward the TO side, the data select signal $D_s$ of the value "0" will be sent to the control unit 31 so that the RAM(m) is ready for the write operation of only the video information signals concerning the functional locus and the coordinates axes. When the control switch SE is in the TN position, the data select signal $D_s$ of the value "0" is supplied to the control unit 31 so that it is impossible for the RAM(m) to receive any video information signals.

Outputs of the respective RAM(n) are supplied to the brightness/color difference signal generator 25 (FIG. 9). The control unit 31 has a plurality of input terminals (not shown) which in turn are connected to the output terminals 11, 12 and output terminals of another various generator (denoted by 23 as described later) and in addition to a data multiplexer 32 connected to the input terminals $T_{11}$, $T_{12}$, $T_{1k}$ of the respective RAMs. The control unit receives as inputs the video information signals I, J, D, R from the output terminals 11, 12; horizontal synchronizing pulse signals PH, synchronizing select pulse signals R'H synchronous with these signals PH, vertical synchronizing pulse signals PV, synchronizing pulse signals P'V synchronous with these signals PV, and horizontal and vertical division pulse signals PM, PN from the various signal generator 33, and the data select signals DS derived from operation of the control switch SE.

A column address multiplexer 34 is connected to the respective output terminals 12 to specify the column address of the RAM(m) pursuant to the output signal I from the output terminals 12 and an address select signal P"H from the control unit 31.

A row address multiplexer 35 is connected to the respective ones of the output terminals 12 to specify the row address of the RAM(m) pursuant to the information signal J from the output terminals 12 and the address select signal P"H.

A (2N+1) radix counter 36 receives the horizontal synchronizing pulse signals PH and the horizontal division pulse signals PN from the control unit 31 and is pre-set to "0" each time the signal PH comes and the counts the number of the coming signals PN.

A (2M+1) radix counter 37 is connected to the output terminals of the control unit 31 to receive the vertical synchronizing pulse signals PV and the vertical division pulse signals PM such that the counter 37 presets the count thereof to "0" each time the signal PV comes and counts the number of the signals PM. THe counts (2N+1) and (2M+1) of the counters 36, 37 correspond to the numbers of the picture elements on the image screen 10 in the column and row directions.

According to the signals supplied from the output terminals 11 to the control unit 31, the data multiplexer 32 sends the video data signal IDS from the control unit 31 to the column and row address of the RAM(m) specified by the column and row address multiplexers 34, 35.

A picture element select circuit 38, a row select counter 39, a latch circuit 40 and a shift register 41 cooperate together to develop the video data signals concerning the characters, symbols or the like in a well known method.

The respective ones (not shown) of the output terminals 12 are connected to the input terminal (not shown) of the latch circuit 40 such that the 5-bit video information signals (the key information described above) concerning the characters, symbols or the like are transferred from the output terminals 12 to the 5-bit latch circuit 40. The row select counter 39 is cleared by a key signal from the control unit 31 and incremented by a clock pulse signal $C_{r1}$, instructing the latch circuit 40 to deliver the 5-bit video information signals to the picture element select circuit 38.

The row select counter 39 converts the 5-bit signals from the latch circuit 40 into 6-bit signals which in turn are sent to the shift register 30. The shift register 41 is pre-set by a pre-set signal PS and sends the 6-bit information stored therein to the data multiplexer 32 in synchronous with the clock pulses $C_{r1}$.

The column and row address multiplexers 34, 35 are under the control of the synchronizing select pulse signals P'H, while the data multiplexer 32 is controlled by turning the switch SE to any side of TN, TO or TK. In other words, the data multiplexer 32 provides the functional locus data when the switch SE is in the position TO or TN and provides the data such as the characters, symbols or the like when the switch SE is in TK position (see FIGS. 16 and 17).

The select switches $SC_1$–$SC_k$ are incorporated into the circuit SEC as denoted by the broken line in FIG. 10, the circuit SEC being provided for each of the respective RAM(n). As stated above, the RAM(n) where the video information signals I, J, R, D are to written may be selected through the select switch SCm in the ON state of the select switches $SC_1$–$SC_k$.

The circuit SEC (n) includes an RS flip flop F(n), an OR logic gate OR(n), an AND logic gate AND, a one-shot pulse generator G(n) and the above described select switch SC(n). The one-shot generator G(n) provides a one-shot pulse signal when the PK key is depressed and any one of the key unit KU is depressed, such that the one-shot pulse signal resets the RS flip flop F(n) to clear the specifying of the RAM(m).

Figure 15:
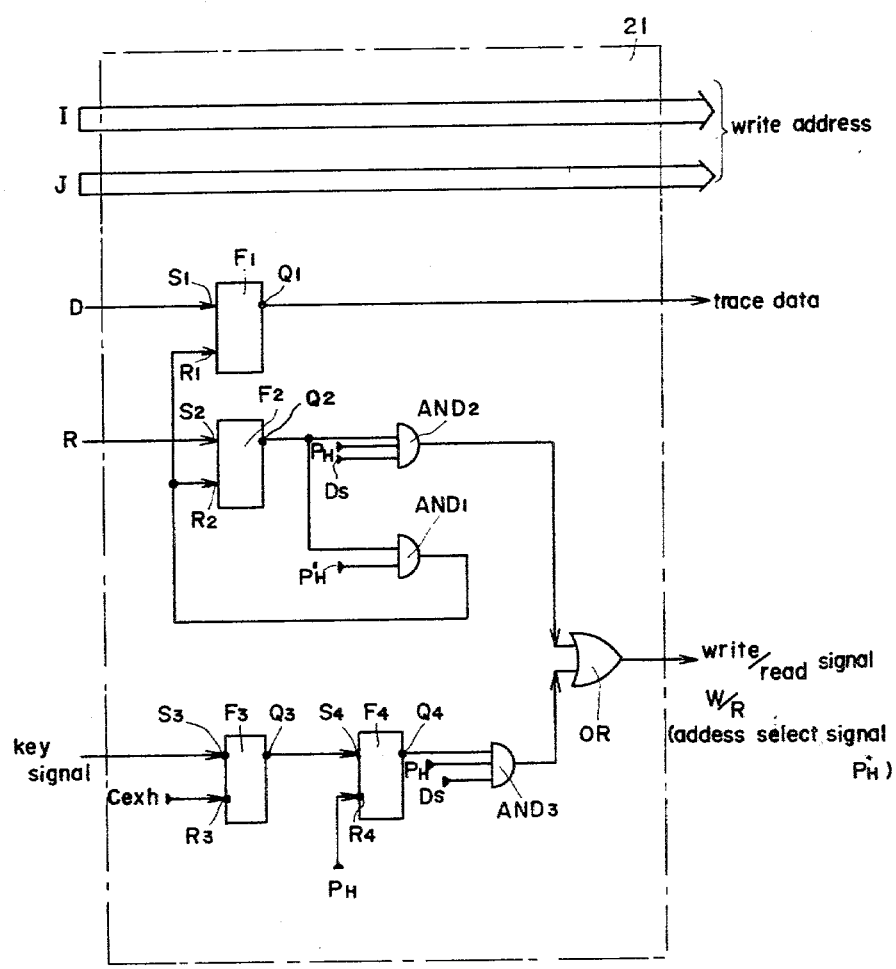
FIG. 15 is a block diagram of a control unit for the store circuit of the signal converter interface.

A typical example of the control unit 31 is illustrated in FIG. 15 wherein a first flip flop $F_1$ in an RS flip flop is shown with its set terminal connected to the output terminal 12 and its output terminal $Q_1$ connected to the multiplexer 35. Like the flip flop $F_1$ a second flip flop $F_2$ is an RS flip flop with its set terminal $S_2$ connected to the output terminals 12 and its output terminal $Q_2$ connected to an input of a first AND logic gate $AND_1$ and an input of a second AND logic gate $AND_2$. The first AND logic gate AND 1 also receives the horizontal synchronizing pulse signals PH from the signal generator 32, whereas the second AND logic gate AND 2 also receives the synchronizing select pulse signals P'H from the signal generator 32 and the data select signal DS via the control switch SE.

The output terminal of the first AND logic gate AND 1 is connected to the respective reset terminals $R_1$, $R_2$ of the first and second flip flops $F_1$, $F_2$ and the column and row address multiplexers 34, 35, whereas the output of the second AND logic gate AND 2 is connected to the input terminals $T_{21}$, $T_{22}$, ... $T_{2k}$ of the respective RAM(n) of the store circuit 11 via the OR logic gate OR.

In FIG. 15, a circuit arrangement comprising third and fourth RS flip flop $F_3$, $F_4$, a third AND logic gate AND 3 and an OR logic gate OR controls the operation of writing the video information signals such as characters or the symbols into the RAM(k).

A set terminal $S_3$ and a reset terminal $R_3$ of the third flip flop $F_3$ are connected to receive the key signals and the clock pulse signals C exh. A set terminal $S_4$ of the fourth Flip flop $F_4$ is connected to an output terminal $Q_3$ of the third flip flop 3 and a reset terminal $R_4$ is connected to the signal generator 33 to receive the synchronizing pulse signals P'H. A first input terminal of the third AND logic gate AND 3 is connected to an output terminal $Q_4$ of the fourth flip flop $F_4$ and a second input terminal thereof is connected to the signal generator 33 to receive the horizontal synchronizing pulse signals PH with the third input terminal thereof being connected to receive the data select signal $D_s$. The OR logic gate OR has an input terminal connected to the output terminal of the third AND logic gate AND 3 and another input terminal connected to the output terminal of the first AND logic gate AND 1. The output signal of the OR logic gate OR is supplied as the address select signal P"H to the column and row address multiplexers 34, 35 and the input terminals $T_{11}$, $T_{12}$, ... $T_{1k}$ of the RAM(n).

With such an arrangement, when the signal D of the functional locus information is applied to any one of the output terminals as "1", the first flip flop $F_1$ is set to send the signal "1" to the RAM(m). Thereafter, when the signal R is applied to any one of the output terminals 6 as "1", the second flip flop $F_2$ is set while the AND logic gate AND 1 is being supplied with the horizontal synchronizing pulse signal PH from the signal generator 33 of FIG. 9. Therefore, the write/read signals W/R are developed from the second AND logic gate AND 2 via the OR logic gate OR. In this manner, the video data signal IDS, or the output $Q_1$ of the first flip flop $F_1$ is written into the RAM(m) via the multiplexer 32. Thereafter, immediately after the development of the signal R the pulse $P_{\overline{h1}}$ of the synchronizing select pulse train P'H is supplied from the signal generator 33 to the first AND logic gate AND 1, permitting the first AND logic gate AND 1 to develop the signal "1". As a result, the first and second flip flops $F_1$, $F_2$ are reset. The output of the first flip flop $F_1$ (or, the video data signal IDS) and the output of the first AND logic gate $AND^1$ (viz., the write and read signals W/R) stand at a level "0" unless no signals D and R are developed at the output terminals 11. Consequently, no video information concerning the functional locus is written into the RAM(m).

The third flip flop $F_3$ will be set upon receipt of the key signals at the set terminal $S_3$ thereof. At this time, the pulse $P_{\overline{h2}}$ of the synchronizing select pulse train P'H applied to the reset terminal $R_4$ of the fourth flip flop $F_4$ permits the output to be picked up from the third flip flop $F_3$. After completing the writing operation of the keyed information such as characters, symbols or the like onto the RAM(m), the clock pulse signal $C_{exh}$ is applied to the reset terminal $R_3$ of the third flip flop $F_3$, thereby resetting the same $F_3$. Then, the pulse $P_{\overline{h1}}$ of the synchronizing select pulse train P'H is applied to the reset terminal R which in turn is reset. Under the circumstance, the OR logic gate OR develops "0" as the write/read signal W/R at its output terminal. That is, the video information concerning the characters, symbols or the like is not permitted to be written into the RAM(m).

As discussed above, when the information signals I, J, D, R are supplied from the output terminals 11, 12 the control unit 31 supplies the signals I, J to the address multiplexers 34, 35 and senses that the signal D assumes the value "1" and senses the presence of the signal D. In this manner, the signal D is written into the column and row address of the RAM(n) specified by the address multiplexers 34, 35.

In the given embodiment, when the calculator 1 provides the signals I, J for the output terminals 12, the signal D is developed at the output terminal 11 (the setting of D) and the signal R is developed (the setting of R).

Figure 16:
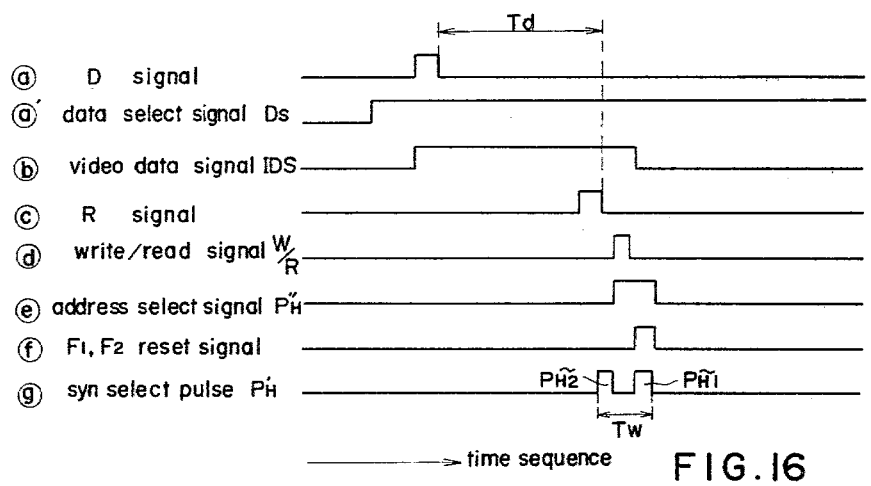
FIG. 16 is a waveform diagram showing the procedure on the same time scale where video information is written within the store circuit of the signal converter.

The time relationship among the video information signals R, D applied to the control unit 31, the horizontal synchronizing pulse signal PH, the synchronizing select pulse signals P'H, the video data signal IDS applied IDS applied to the RAM(m) specified by the control unit 31 and the write/read signal W/R is depicted in FIG. 16.

In FIG. 16, ⓐ denotes the D signal, ⓐ' denotes the data select signal $D_s$, ⓑ denotes the video data signal IDS, ⓒ denotes the R signal, ⓓ denotes the write/-signal W/R, ⓔ denotes the reset signal for resetting the first and second flip flops $F_1$, $F_2$, and ⓕ denotes the synchronizing select pulse train P'H.

Figure 17:
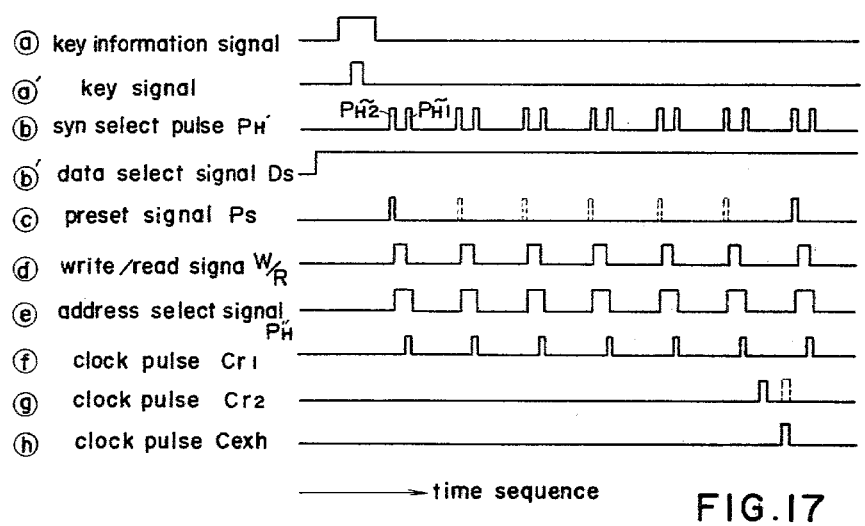
FIG. 17 is a waveform diagram showing the procedure on the same time scale where video information indicative of characters, symbols or the like is written within the store circuit.
Figure 18:
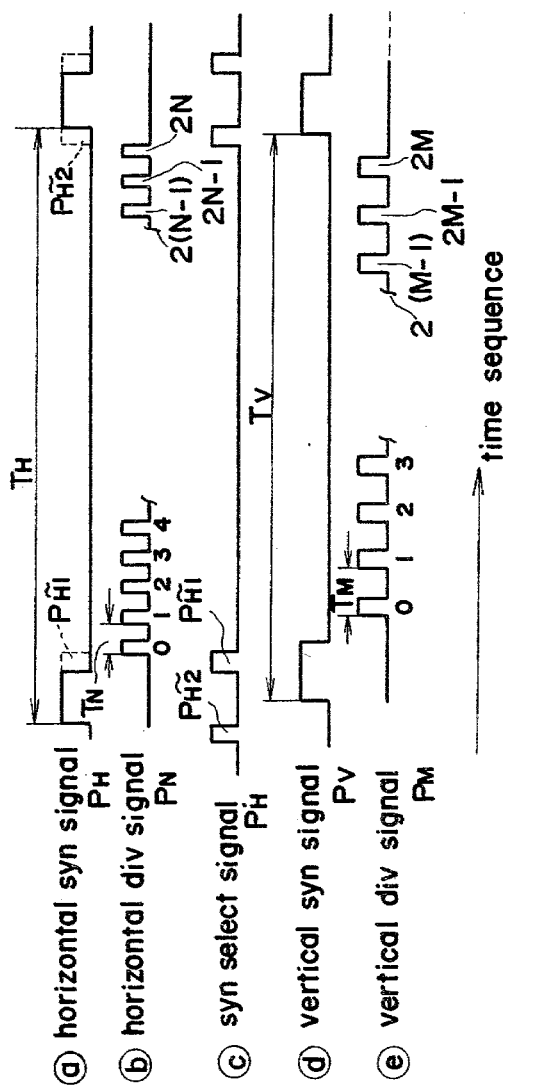
FIG. 18 is a waveform diagram showing pulse trains used while reading out video information contained within the store circuit.

As best seen from FIG. 16, a delay time Td of the signal R with respect to the signal D is selected to be shorter than the repetition cycle of the horizontal synchronizing pulse signals PH. The pulse width TW of the synchronizing select pulse signal P'H is longer than the pulse width of the horizontal synchronizing pulse signals PH, that is, that from the so-called front porch to the back porch of the horizontal flyback period in the conventional TV receiver system. In other words, within the synchronizing select pulse train P'H, the pulse signals $P_{\overline{H1}}$ and $P_{\overline{H2}}$ are longer than the front porch and the back porch at the leading edge and trailing edge of the horizontal synchronizing signal PH. In order to display all images on the image screen 10 due to the video information signals I, J, D, R from the output terminals 11, 12 the peripheral portion of the image screen 10 is blanked a little wider than the normal blanking dimension as established by the composite video signals of the commercial TV broadcasting. In FIG. 17, there are illustrated the video data signal IDS concerning the characters, symbols or the like from the shift register 30 and the write/read signal E/R from the control unit 31 in the same time scale. ⓐ denotes the key information signal generated from depression of the information select key 1b, ⓐ' denotes the key signal generated where the key information signal ⓐ is being generated, ⓑ the synchronizing select pulse train P'H, ⓑ' denotes the data select signal Ds. ⓒ denotes the pre-set signal PS, ⓓ denotes the write read signal R/W, ⓔ denotes the reset signal RS for the flip flops $F_1$, $F_2$, ⓕ denotes the clock pulse signal Cr2, and ⓖ denotes the clock pulse signal $C_{exh}$.

The reset pulse signal RS for the flip flops $F_1$, $F_2$ as denoted by ⓔ is the clock pulse signal $C_{r1}$ useful to execute the shift operation of the shift register 41. The clock pulse $C_{r2}$ is applied to the row select counter 39 and the clock pulse $C_{exh}$ is indicative of the completion of the write operation of the video information concerning the characters, symbols or the like to the RAM(k).

Pursuant to the signals I, J, R, D derived from the calculator 1, the control unit 31 reads the video data signal IDS out from the RAM(m) in the following manner.

The video data signal IDS is read out from the RAM(m) by cooperation of the counter 36, 37 counting the number of the horizontal and vertical division pulses PN, PM in synchronization with the horizontal and vertical pulse signals PH, PV and the I and J address multiplexers 34, 35 specifying the address (I, J) of the RAM(m) according to the contents of these counters 36, 37.

The readout operation is executed when the first and second flip flops $F_1$, $F_2$ are reset, in other words, when the write/read signal W/R is "0".

The horizontal and vertical division pulse signals PN and PM are pulse train signals having the intervals TN and TM which are divisions of the respective intervals PH and PV of the horizontal and vertical synchronizing pulse signals PH and PV by the number of the columns and rows of the image screen 10.

As described above, the write and read operations of the video data signal IDS to and from the RAM(m) are governed by the addressed select signals P"H similar to the write/read signal W/R. The write/read signal W/R is developed from the OR logic gate in the control unit 31 OR in response to the interval select pulse train P'H and the R signal and located within the horizontal flyback period of the TV receiver 3 and completely synchronous with the horizontal period pulse train PH. Therefore, this signal precludes a flicker effect on the image display on the image screen 10 of the TV receiver 3.

The output signal from the store circuit 21, that is, the video data signal IDS written into the RAM(m) of the store circuit 21 and then read out from the RAM(m) is processed in the following manner.

A various signal generator 23 of FIG. 3 is a well known oscillator per se which produces the horizontal synchronizing pulse train $P_H$, the synchronizing select pulse train P'H, the vertical synchronizing pulse train PV, the vertical synchronizing pulse train P'V, the horizontal division pulse train PN, the vertical division pulse train $P_M$, a color carrier CSC, an equalizing pulse signal EP, a burst signal $S_B$, etc.

An OR logic circuit 24 has its input terminals connected to the signals PH, P'H, PV, P'V from the signal generator 23 and its output terminal connected to the brightness-color difference generator 14 to receive the blanking pulse signal.

The brightness-color difference signal generator 25 has an input terminal 14a connected to the output terminals of the respective RAM, - $RAM_k$, an input terminal 14b connected to the various signal generator 23 to receive the color carrier CSC, and an input terminal 14C connected to the OR logic circuit 24. The brightness-color difference signal generator 25 provides signals indicative of the brightness and hue of the video data signal IDS according to the signals introduced via the input terminals 14a, 14b, 14c.

A signal composition circuit 26 receives the output signals from the brightness-color difference signal generator 25 and the signals $P_H$, $P_E$, $S_B$ from the generator 23 and develops composite TV video signals in the form of composition of these signals.

A modulator 27 is adapted to frequency modulate the composite video signals from the signal composition circuit 26 with a channel frequency of the TV receiver 3, for example, the vacant channel frequency where the commercial TV carrier wave is not available as an ultra-high frequency signal. An ultra-high frequency oscillator 28 sends the modulation wave signal to the modulator 27. A position detector 29 receives the signal from the pen light 9 and detects the position lightened by the pen light 9. An antenna terminal of the TV receiver 3 is denoted by 30.

The modulator 27 and the ultra-high frequency oscillator 28 may be housed within a casing (not shown) of the TV receiver 3 such that the output terminal (not shown) of the signal composition circuit 26 is connected to an input terminal (not shown) of the modulator 27 installed inside the housing through a connection cord (not shown), enabling the signal converter interface 2 of light weight.

As an alternate, the signal converter interface 2 may be housed within the casing (see FIG. 1) of the calculator 1 so that the select switches $SC_1$ through $SC_k$ and the control switch SE in the signal converter interface side 2 are disposed on the operational face 1b of the key unit KU on the calculator side 1.

Figure 19:
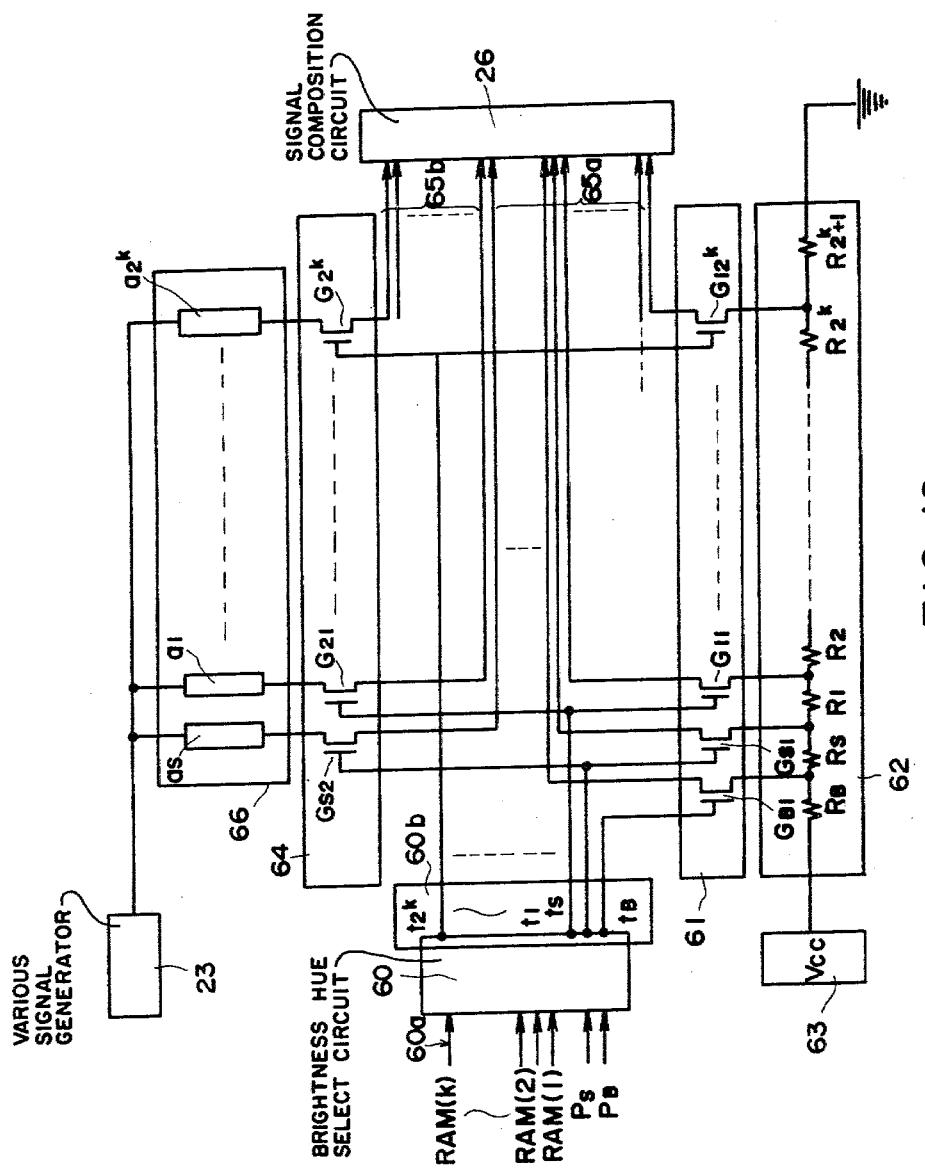
FIG. 19 is a block diagram of an example of a brightness signal and color difference signal generator within the signal converter interface.
Figure 20:
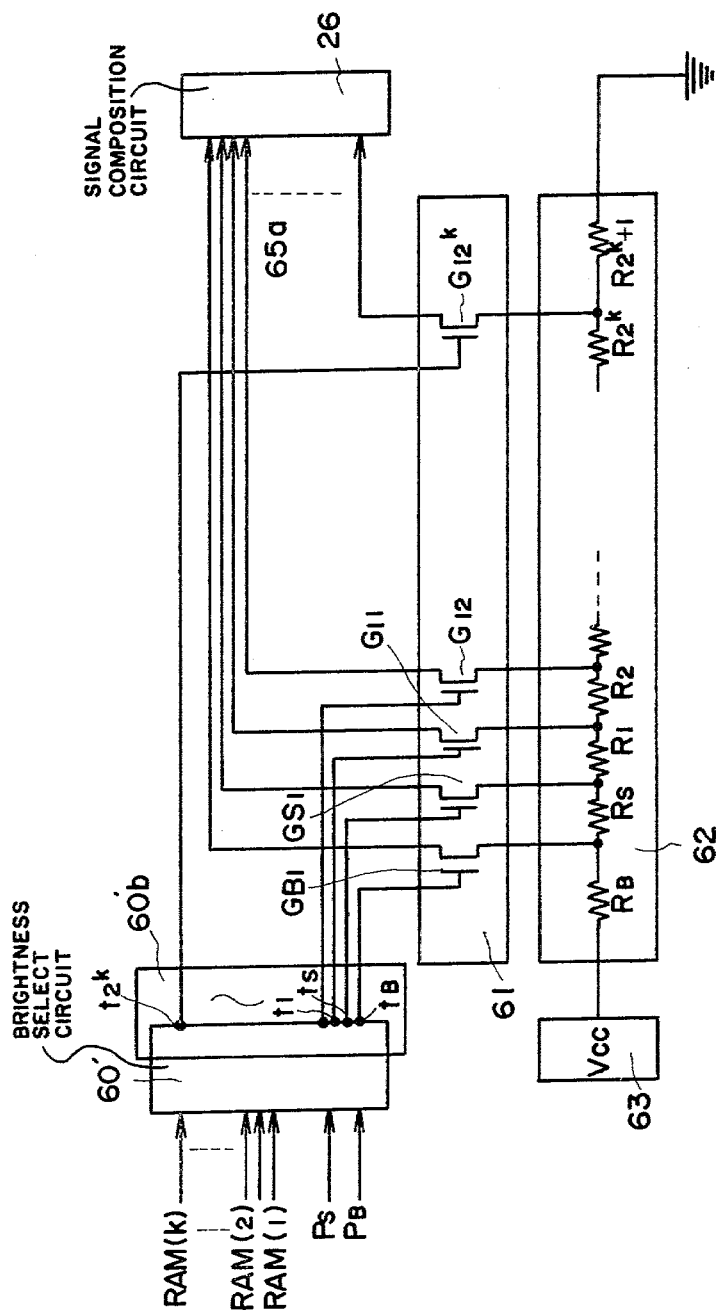
FIG. 20 is a block diagram of another example of a brightness signal generator within the signal converter for use in a black and white television receiver.

A detail example of the brightness-color difference signal generator 25 is illustrated in FIG. 19. Another example of a brightness signal generator 14' suited to a black and white television receiver is illustrated in FIG. 20.

A brightness hue select circuit 60 of FIG. 19 has $(k+2)$ input terminals 37a and $(2+2^k)$ output terminals 37b (wherein K: the same number as the RAM(n)) receiving the video data signal IDS read out from the RAM(m), the blanking pulse signal $P_B$ from the OR logic circuit 24 and the signal $P_s$ calling for cursor movement due to depressions of the BACK key, the SP key and the LF key within the operational mode keys 1c, and output terminals 60b providing a "1" level signal for the output terminal Tm(m: the specified number) specified by the signal applied to the input terminals 60A.

A first FET (filed effect mode transistors) group consists of $(2+2^k)$ FETs each having the gate $G_{B1}$, $G_{S1}$, $G_{11}$, ... $G_{12k}$ connected to the respective output terminal $T_B$, $T_S$, $t_1$ ... $t_{2k}$ of the output terminals 60b, the drain connected to the respective ones of the $(2+2^k)$ output terminals 61a, and the source connected to respective taps of a series resistor group 62. The resistor group 62 is a series connection of $(3+2^k)$ resistors $R_B$, $R_S$, $R_1$, ... $R_{2k}$, $R_{2k+1}$ with their taps at one end connected to the respective sources of the FETs within the FET group 61. A DC, constant voltage source 63 supplies a given voltage across the series resistor group 62. A second FET group 64 comprises $(1+2^k)$ FETs with the respective gates thereof $G_{S2}$, $G_{21}$, ... $G_{22k}$ connected to the output terminals $t_s$, $t_1$, $t_{2k}$ other than the output terminal $t_B$ within the output terminals 60b, the respective drains thereof connected to the respective ones of the $(1+2^k)$ output lines 65B and the sources thereof connected to respective ones as, $a_1$, $a_2$, ... $a_{2k}$ of a $(1+2^k)$ amplitude-phase control circuit group 66. The respective control circuits $a_x$, $a_1$, ... $a_{2k}$ are adapted to establish the color phase of the color carrier CSC from the various signal generator 23 at a desired level through the respective FETs in the second FET group 64.

When the blanking pulse $P_B$ is "1" within the brightness-color difference signal generator 25, only the FET gate $G_{B1}$ of the first FET group 61 will be turned on so that the brightness signal of the black level is developed at the 1 output line of the output lines 65a. An image displayed on the image screen 10 stands at the black level. If the cursor movement instruction signal $P_S$ is "1", then only the FET gates $G_{s1}$, $G_{s2}$ in the first and second FET groups 61, 64 will be turned on so that the brightness and hue signals of given levels are developed at the respective output lines of the output terminals 65a, 65b. Accordingly, the cursor position is displayed with a given brightness and a desired hue. When the blanking signal $P_B$ and cursor movement instruction signal $P_S$ are both "0", the video data signal IDS is introduced into the output terminal $t_m$ of the brightness-phase select circuit 60 determined by the row and column structure of the selected RAM(m) where the video information signals I, J, D are written (that is, the "1" pulse signal is applied). At this moment, a respective one FET of the first and second FET group 61, 64 is turned on to develop a proper brightness signal and a proper color phase signal at the output lines of the output lines 65a, 65b. When the RAM(m) is multiple, a plurality of images displayed on the screen 10 appear at different brightness and hues pursuant to the video data signals IDS read out from the respective RAM(m).

When video information signals concerning a plurality of the functional loci are written into the plurality of the RAM(m) and the plurality of the functional loci are displayed on the image screen 10 of the TV receiver 3, it is possible to display two or more functional loci and their intersections at different brightnesses and different hues to facilitate recognition of the respective functional loci and their intersections.

The brightness signal generator 25' for a black and white version, as seen from FIG. 20, is similar to the brightness-color difference signal generator 25 with the second FET group 64, the amplitude phase control circuit group 66 and the output line group 65b omitted. This comprises a brightness select circuit 60, and an output terminal group 60b' of the brightness select circuit 60', with the remaining components (the first FET group 61, the series resistor group 62 and the reference voltage source 63) being the same construction as in the brightness-color difference signal generator 25. When a plurality of the functional loci are displayed on a black and while version of the TV receiver (otherwise a color version), the brightness signal generator 25' makes it possible to display two or more functional loci and their intersections at a given brightness.

Figure 21:
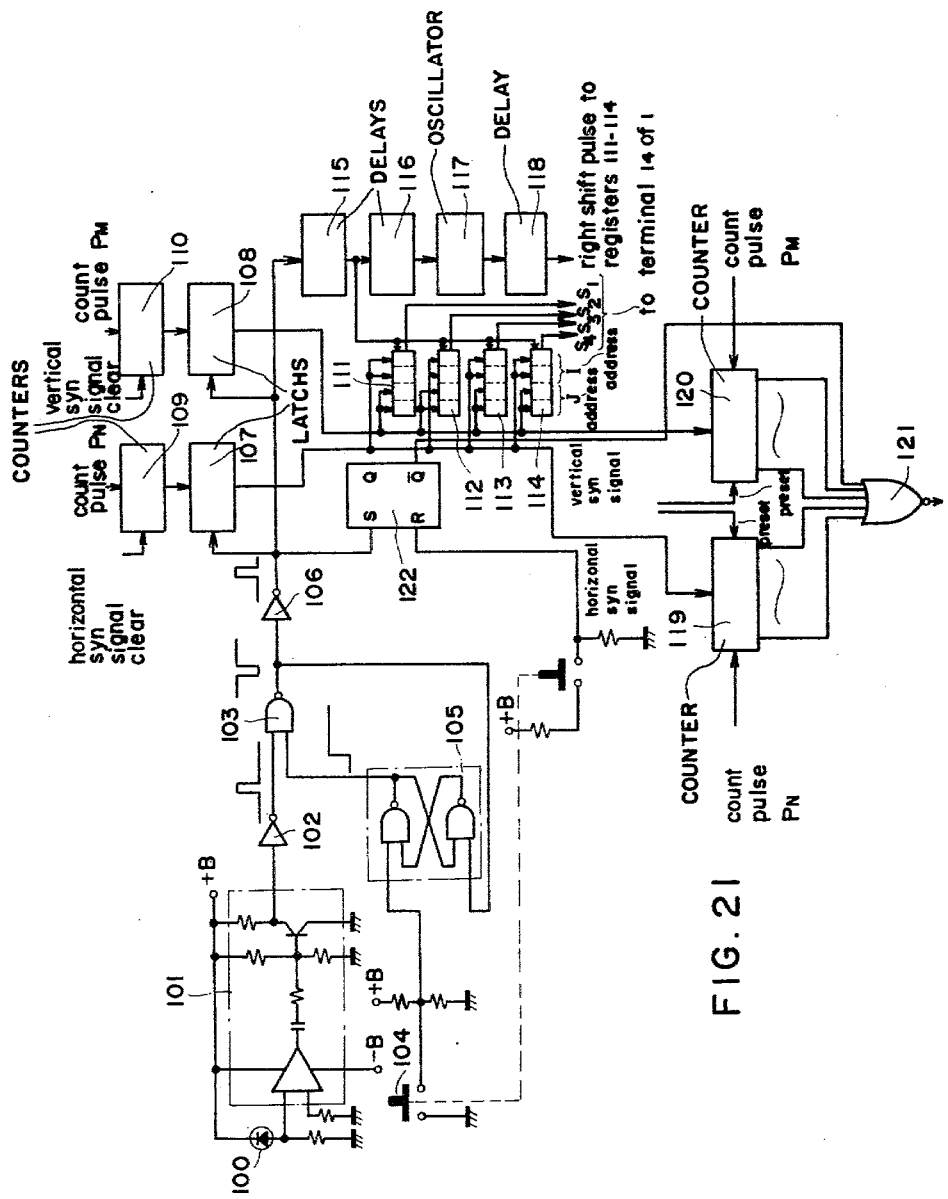
FIG. 21 is a block diagram of a position detector disposed within the signal converter interface of the present invention.

The position detector 29 contained within the signal converter interface of FIG. 9 is illustrated in FIG. 21.

In FIG. 21, a light sensitive photo diode 100 is secured at the tip of the pen light 9 and connected to an input terminal of an amplifier 101 of which the output is connected to an inverter 102 for inversion is polarity. The resulting positive polarity pulse is applied to a NAND logic gate circuit 103.

A start switch 104 secured on the pen light 9 is connected to a set input terminal of a flip flop 105 of which the output is connected to an input terminal of the NAND logic gate 103. An output of the NAND logic gate circuit 103 is connected to a reset terminal of the flip flop 105 and an inverter 106.

An output terminal of the inverter 106 is connected to latch input terminals of I, J address latches 107, 108 of which the data input terminals are respectively connected to output terminals of I, J address counters 109, 110.

The I address counter 109 is a $(2N+1)$ radix counter which is supplied with the horizontal division pulse $P_M$ and cleared with the horizontal synchronizing signal. The output data of the I address counter 109 is indicative of the coordinates position on the image screen 10 in the horizontal directions. The J address counter 110, on the other hand, is a (2M+1) radix counter which is supplied with the vertical division pulse $P_N$ and cleared with the vertical synchronizing signal. The output data from the J address counter 110 is indicative of the coordinates position on the image screen 10 in the vertical direction. When the pulse of the specific point on screen 10 sensed by the pen light 9 is transferred from the inverter 106 to the I, J address latches 107, 108, both address latches are permitted to store the output data of the I, J address counters 109, 110 indicative of the coordinates position of the specific point.

The respective outputs of the I, J address latches 107, 108 are connected to enter into different registers 111, 112, 113 114 which also receive an output of a first delay circuit 115 delaying an output pulse of an inverter 106. These outputs of the registers 111 through 114 are applied to the input terminals $S_1$ through $S_4$ of the calculator 1.

An output of the first delay circuit 115 is connected to a second delay circuit 116 of which the output is connected to a clock pulse oscillator 117. An output of the oscillator 117 is connected to a third delay circut 118. The third delay circuit 118 develops four pulses which are supplies as a right shift pulse to the respective registers 111 through 114.

Down counters 119, 120 are connected to the I, J address latches 107, 108 and responsive to the horizontal division pulses PN are the vertical division pulses $P_M$ as the count pulse thereof. The down counters are also supplied as a pre-set instruction signal with the horizontal synchronizing signals and the vertical synchronizing signals. The outputs of the down counters 119, 120 are applied to the brightness-color difference signal generator 25 via a NOR logic circuit 121.

A flip flop 122 receives at its set input the output of the inverter 106 and its reset input a signal from the start switch 104 and provides its reset output $\overline{Q}$ for the NOR logic gate circuit 121.

The coordinate position of the specific point on the functional locus or the like displayed on the screen 10 will be displayed on a viewing window 7 of the calculator side 1.

The I address counter 109 is cleared by the horizontal synchronizing signals and repeatedly incremented by the horizontal division pulses $P_N$. Meantime, the J address counter 110 is cleared by the vertical synchronizing signals and counts the number of the vertical division pulses $P_M$ repeatedly. The output values of the I, J address counters 109, 110 are representative of the horizontal and vertical coordinates positions on the image screen 10.

Assume now that the functional locus C resulted from the calculator 1 is displayed on the image screen 10 of the TV receiver 3. The tip of the pen light 9 is come into contact with the specific point D on the locus C and the switch 104 is turned on.

The switch 104 in the on state sets the flip flop 105 which supplies its set output to the NAND logic gate circuit 103.

Provided that the point D in contact with the pen light 9 is permitted to release light by the scanning of the image screen 10, the photo diode 100 senses such light so that the amplifier 101 is supplied with the pulse longer than the light releasing period. That pulse is amplified by the amplifier 101 and then inverted by the inverter 102 supplying a positive polarity pulse to the NAND gate 103. The NAND logic gate 103 develops a negative polarity pulse which is then inverted through the invertor 106 to form a positive polarity pulse. That positive polarity pulse is applied to the I, J address latches 107, 108 so that the counts of the I, J address counters 109, 110 indicative of the horizontal and vertical coordinates positions of the specific point D are written into the I, J address latches. The output pulse of the NAND logic gate circuit 103 is applied to the reset input terminal of the flip flop 105, resetting the flip flop 105. The input to the NAND gate 103 does not stand any more. As a result, the NAND logic gate 103 and thus the inverter 106 develops only one pulse.

The output pulse of the inverter 106 is applied to the first delay circuit 115 which in turn provides the pulse as denoted by (b) in FIG. 22 with a proper time delay. The resulting pulse is applied to the respective registers 111 through 114, permitting the coordinates data within the I, J address latches 107, 108 to be written into the respective registers 111 through 114 digit by digit. The respective registers 111–114 each consists of 4 bits with two bits storing the I address and the remaining two bits the J address.

The second delay circuit 116 develops the pulse denoted by (c) in FIG. 22 and supplies it to the oscillator 117 which in turn provides the four pulses as shown by (b) in FIG. 22 for the third delay circuit 118. These four pulses are applied to the registers 111–114 to effect the right shift thereon so that the data $S_1$–$S_4$ indicative of the coodinates position of the point D is sent to the coordinate data input terminal 14 of the calculator side 14.

The data in the I, J address latches 107, 108 is also stored in the down counters 119, 120 and decremented each time the horizontal division pulses $P_N$ and the vertical division pulses $P_M$ are applied. The outputs of the both counters 119, 120 are applied to the NOR logic gate 121 which also receive the rest output of the flip flop 122 placed into the reset state upon operation of the switch 104. The output of the NOR gate 121 is "1" when the contents of the down counters 119, 120 are reduced to "0" that "1" signal being supplied to the brightness color difference generator 25. This leads to that the point D is operative to beam light.

The four pulses or resulting from the third delay circuit 118 are supplied to the input terminal 13 of the calculator 1 and then the comparator logic circut JC. When the comparator logic circuit JC confirms the presence of the pulses $\alpha$, it informs the ROM RU of that fact so that the calculator 1 provides an instruction to execute in a flow chart shown in FIG. 23. In other words, when the comparator logic circuit JC senses the first $\alpha_1$ of the $\alpha$ pulses, the data I contained within the registers 111–114 is tranferred into the accumulator ACC. After clearing the I, J registers I, J within the RAM, the first digit data at the I address of the accumulator ACC is transferred into the first digit place of the register I. Subsequently, if the second pulse $\alpha_2$ is detected by the comparator logic circuit JC, then the data in the registers 111–114 is transferred into the accumlator ACC and the second-digit data at the I address is shifted to the second-digit place of the register I.

Upon detection of the third pulse $_3$ the first-digit data at the J address is shifted into the J register of the RAM. In response to the fourth pulse $\alpha_4$ the second-digit data at the J address is transferred into the second-digit place of the J register of the RAM.

The contents of the I register are substracted from N and such a difference is multiplied by αy so as to calculate the x coordinates position, whereas the contents of the J register are subtracted from M and such a difference is multiplied by αy so as to obtain the Y coordinates axis position. The coordinates positions of the point D is therefore calculated and the results of the calculations are displayed in a digital fashion through the viewing window 7 after transferring into a display register DSP, in the same way as in a conventional calculator.

Although the signal converter interface is provided away from the calculator 1 is the above illustrated embodiment, it is obvious that the calculator-to-TV screen interface may be disposed within the casing of the calculator 1.

The invention being thus described, it will be obvious that the same may be varied in many ways. Such modifications are not toe be regarded as a departure from the spirit and scope of the invention, and all such modifications are intended to be included to be included within the scope of the following claims.

We claim:

1. A display system for displaying the characteristic shape of an analog output function F(x) having a plurality of data points produced by an electronic calculator onto the television screen of a television receiver, comprising:
    means included within said electronic calculator for providing data indicative of the function F(x); and
    signal converter interface means connected between said means for providing and said television receiver, said signal converter interface means including means for converting said data indicative of the function F(x) into a composite video signal which may be received by said television receiver.

2. The display device according to claim 1 wherein said data includes position information indicative of the coordinate positions of said plurality of data points on said screen.

3. A display system for displaying output information provided by an electronic calculator onto the television screen of a television receiver, comprising:
    means for providing data indicative of the output information provided by said electronic calculator said data including position information indicative of the coordinate positions of said output information;
    means for converting said data into a television signal;
    means for detecting the position of the data being displayed at a desired coordinate position on said television screen by detecting light emitted from said position;
    means for displaying the coordinate position of said data detected by said detecting means.

4. A system for displaying a the characteristic shape of an analog function F(x) comprising:
    electronic calculating means for producing data representative of a function F(x);
    converter interface means for converting said data produced by said calculating means into a composite video signal; and
    television means for converting said composite video signal into a graphical representation of said function F(x) displayed on a television screen.

5. The system of claim 4 wherein said data is representative of at least two functions; and
    wherein any of said functions may be converted into said composite video signal to be displayed by said television means alone or simultaneously in combination with one or more of the other said functions.

6. The system of claim 5 wherein said television means simultaneously displays all of said functions on said television screen.

7. The system of claims 4, 5, or 6 wherein said video component signal also includes data representative of at least one coordinate axis which is simultaneously displayed on said television screen with the graphical representation of said function.

8. The system of claim 7 wherein said function has at least one maximum or minimum; and
    wherein said data representative of said coordinate axis displays an ordinate, an abscissa, and also displays the coordinates of said maximum or minimum with visual maxima and minima cursors.

9. The system of claim 4 wherein said electronic calculating means includes a common keyboard panel including digit keys, mathematical operator keys, mathematical function calculation keys, and scale increment keys which may be used in conjunction with said digit keys to vary the scale of said graphical representation of said function.

10. The system of claim 9 wherein said scale increment keys include,
    a first scale increment key for varying the scale in a first direction, and
    a second scale increment key for varying the scale in a second direction orthogonal to said first direction.

11. The system of claim 5 wherein said converter interface means includes brightness-color signal generator means for generating information indicative of the color of each function and for modifying said composite video signal to include said information;
    wherein said television means has a color display capable of reproducing said information to produce said graphical representations in color.

12. The system of claim 11 wherein said information provides a different color for each function displayed.

13. The system of claim 12 wherein said converter interface means further includes function crossing detection means for providing a signal representative of each intersection between two of said functions.

14. The system of claim 13 wherein said brightness-color signal generator means modifies said composite signal to make the color of said intersections different from the color of either of said two functions.

15. The system of claim 13 wherein said brightness-color signal generator means modifies said composite signal to make the brightness of said intersections different from the brightness of either of said two functions.

16. The system of claim 4 further comprising:
    a light responsive pen means for detecting the position of a selected lighted point of said television screen, said pen means calculating the position of said selected point.

17. The system of claim 16 wherein said calculating means displays the location of said selected lighted point.

18. The system of claim 16 wherein the location of said selected lighted point is stored by said calculating means.

19. The system of claim 16 wherein said brightness-color signal generator modifies the brightness of said selected lighted point.

20. The system of claim 16 wherein said brightness-color signal generator modifies the color of said selected lighted point.

21. The system of claim 4 wherein character and symbol information may also be displayed on said television screen.

22. A system for displaying the characteristic shape of an analog function F(x) provided by an electronic calculator onto the screen of a television, said system comprising:
data transfer means for providing data representative of said function F(x) from said electronic calculator;
interface storage means for storing the data provided by said data transfer means; and
television signal generation means for converting the data stored in said interface storage means into a composite video signal and applying said composite video signal to said television, said composite video signal produced by said television signal generation means displaying said function F(x) on said screen of said television.

23. The system of claim 22 wherein said data is representative of at least two functions; and
wherein any of said functions may be converted into said composite video signal to be displayed by said television along or simultaneously in combination with one or more of the other of said functions.

24. The system of claim 22 wherein said video component signal causes said television to simultaneously display all of said functions on said television screen.

25. The system of claim 22, 23, or 24 wherein said video component signal also includes data of at least one coordinate axis which is simultaneously displayed on said television screen with said function.

26. The system of claim 25 wherein said function has at least one maximum or minimum; and
wherein said data representative of said coordinate axis displays an ordinate, an abscissa, and also displays the coordinates of said maximum or minimum with visual maxima and minima cursors.

27. The system of claim 23 further comprising:
brightness-color signal generator means for generating information indicative of the color of each function and for modifying said composite video signal to include said information;
wherein said television means has a color display capable of reproducing said information to display said function in color.

28. The system of claim 27 wherein said information provides a different color for each function displayed.

29. The system of claim 28 further comprising:
a function crossing detection means for providing a signal representative of each intersection between two of said functions.

30. The system of claim 29 wherein said brightness-color signal generator means modifies said composite signal to make the color of said intersections different from the color of either of said two functions.

31. The system of claim 29 wherein said brightness-color signal generator means modifies said composite signal to make the brightness of said intersections different from the brightness of either of said two functions.

32. The system of claim 22 further comprising:
light responsive pen means for detecting the position of a selected lighted point of said television screen, said pen means calculating the position of said selected lighted point.

33. The system of claim 32 wherein said electronic calculator displays the location of said selected lighted point.

34. The system of claim 32 wherein the location of said selected lighted point is stored by said electronic calculator.

35. The system of claim 32 wherein said brightness-color signal generator modifies the brightness of said selected lighted point.

36. The system of claim 32 wherein said brightness-color signal generator modifies the color of said selected lighted point.

37. The system of claim 22 wherein character and symbol information may also be displayed on said television screen.

38. A system for calculating the position of a selected illuminated point on a television screen displaying data in an M×N array of points having individual M and N coordinates, said system comprising:
screen illumination means for displaying said data on said screen by individually and successively energizing the points in said array using the respective individual coordinates fo each of said points;
a light detector pen for sensing the illuminated condition of a selected point on said screen and for producing a light timing signal;
a first counter for counting the M coordinate of said point being illuminated and producing an M coordinate signal in response thereto;
a second counter for counting the N coordinate of said point being illuminated and producing an N coordinate signal in response thereto;
means for storing said M and N coordinate signals received from said first and second counters; and
latch means responsive to said light timing signal for disconnecting said M and N coordinate signals from said means for storing;
the M and N coordinate signals stored in said means for storing being the respective individual coordinates of said selected point.

39. The system of claim 38 further comprising:
display means for digitally displaying the coordinates of said selected point.

40. The system of claim 38 wherein the coordinates of said selected point are used to vary the intensity of energization of said selected point.

* * * * *